(12) United States Patent
Antonopoulos et al.

(10) Patent No.: US 10,482,263 B2
(45) Date of Patent: Nov. 19, 2019

(54) COMPUTING ON ENCRYPTED DATA USING DEFERRED EVALUATION

(71) Applicant: Microsoft Technology Licensing, LLC, Redmond, WA (US)

(72) Inventors: Panagiotis Antonopoulos, Redmond, WA (US); Ajay S. Manchepalli, Sammamish, WA (US); Kapil Vaswani, London (GB); Haohai Yu, Redmond, WA (US); Michael James Zwilling, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 14/676,574

(22) Filed: Apr. 1, 2015

(65) Prior Publication Data

US 2016/0292430 A1    Oct. 6, 2016

(51) Int. Cl.
*G06F 21/60* (2013.01)
*G06F 16/951* (2019.01)
*G06F 21/62* (2013.01)

(52) U.S. Cl.
CPC .......... *G06F 21/602* (2013.01); *G06F 16/951* (2019.01); *G06F 21/6227* (2013.01)

(58) Field of Classification Search
CPC .................... G06F 21/602; G06F 17/30864
USPC ........................................................ 713/189
See application file for complete search history.

(56) References Cited

U.S. PATENT DOCUMENTS

| | | |
|---|---|---|
| 6,029,160 A | 2/2000 | Cabrera et al. |
| 6,356,887 B1 | 3/2002 | Berenson et al. |
| 8,006,299 B2 | 8/2011 | Suominen |
| 8,627,107 B1 | 1/2014 | Kennedy et al. |
| 8,751,828 B1 | 6/2014 | Raizen et al. |
| 8,788,806 B2 | 7/2014 | Begum et al. |

(Continued)

OTHER PUBLICATIONS

ATM Marketplace, First Digitally Signed payment sent through EFT network, Feb. 21, 2002, DieBold Nixdorf, all.*

(Continued)

*Primary Examiner* — Ashokkumar B Patel
*Assistant Examiner* — William B Jones
(74) *Attorney, Agent, or Firm* — Fiala & Weaver P.L.L.C.

(57) ABSTRACT

Methods, systems, apparatuses, and computer program products are provided for processing queries. A data server includes a query processor configured to receive a query from a database application, which was received by the database application from a requestor. The query is directed to data stored at the data server. The query processor includes a deferred evaluation determiner and deferred expression determiner. The deferred evaluation determiner is configured to analyze the query, and to designate the query for deferred evaluation by the database application if a predetermined factor is met, such as the query including an operation on encrypted data that is not supported at the data server. The deferred expression determiner is configured to determine expression evaluation information for evaluating at least a portion of the query at the database application. The query processor provides the encrypted data and the expression evaluation information to the database application for evaluation.

24 Claims, 9 Drawing Sheets

(56) References Cited

U.S. PATENT DOCUMENTS

| | | | |
|---|---|---|---|
| 8,843,997 B1* | 9/2014 | Hare | H04L 63/0281 709/200 |
| 9,349,023 B2 | 5/2016 | Mori et al. | |
| 2004/0243799 A1 | 12/2004 | Hacigumus et al. | |
| 2004/0243816 A1 | 12/2004 | Hacigumus et al. | |
| 2005/0273772 A1* | 12/2005 | Matsakis | G06F 8/41 717/136 |
| 2008/0208743 A1* | 8/2008 | Arthur | G06Q 20/105 705/41 |
| 2008/0215509 A1 | 9/2008 | Charlton | |
| 2009/0100033 A1 | 4/2009 | Kim et al. | |
| 2009/0327220 A1 | 12/2009 | Meijer et al. | |
| 2011/0167056 A1 | 7/2011 | Khanolkar et al. | |
| 2013/0191650 A1 | 7/2013 | Balakrishnan et al. | |
| 2014/0181517 A1* | 6/2014 | Alaranta | H04L 63/062 713/168 |
| 2014/0281578 A1 | 9/2014 | Bennison | |
| 2014/0298039 A1* | 10/2014 | Pandya | G06F 12/1408 713/190 |
| 2015/0039586 A1 | 2/2015 | Kerschbaum et al. | |
| 2016/0055348 A1 | 2/2016 | Lewak | |

OTHER PUBLICATIONS

Arasu, et al., "A Secure Coprocessor for Database Applications", In Proceedings of 23rd International Conference on Field Programmable Logic and Applications, Sep. 2, 2013, 9 pages.

Wong, et al., "Secure Query Processing with Data Interoperability in a Cloud Database Environment", In Proceedings of ACM SIGMOD International Conference on Management of Data, Jun. 22, 2014, pp. 1395-1406.

Bain, et al., "4. A Domain-Specific Language for Computing on Encrypted Data", In Proceedings of 31st International Conference on Foundations of Software Technology and Theoretical Computer Science, Dec. 12, 2011, pp. 6-24.

Mitchell, et al., "Information-Flow Control for Programming on Encrypted Data", In IEEE 25th Computer Security Foundations Symposium, Jun. 25, 2012, 49 pages.

Bugiel, et al., "Twin Clouds: An Architecture for Secure Cloud Computing", In Proceedings of the Workshop on Cryptography and Security in Clouds Zurich, Mar. 2011, 11 pages.

Faleiro, et al, "Lazy Evaluation of Transactions in Database Systems", In Proceedings of ACM SIGMOD International Conference on Management of Data, Jun. 22, 2014, pp. 15-26.

Kong, et al., "Enabling Access Control in Partially Honest Outsourced Databases", In International Journal of Database Theory and Application, vol. 7, No. 3, Oct. 27, 2014, pp. 63-72.

Tu, et al., "Processing Analytical Queries over Encrypted Data", In Proceedings of the VLDB Endowment, vol. 6, No. 5, Aug. 26, 2013, 12 pages.

Kerschbaum, et al., "An Encrypted In-Memory Column-Store: The Onion Selection Problem", In Proceedings of the International Conference on Information Systems Security, Dec. 16, 2013, pp. 14-26.

"International Search Report and Written Opinion Issued in PCT Application No. PCT/US2016/025452", dated Jun. 10, 2016, 11 Pages.

"Second Written Opinion Issued in PCT Application No. PCT/US2016/025452", dated Feb. 10, 2017, 5 Pages.

"International Preliminary Report on Patentability Issued in PCT Application No. PCT/US2016/025452", dated Jun. 1, 2017, 6 Pages.

"Final Office Action Issued in U.S. Appl. No. 14/669,848", dated Apr. 20, 2017, 22 Pages.

"Non-Final Office Action Issued in U.S. Appl. No. 14/669,848", dated Sep. 9, 2016, 19 Pages.

Olumotin, et al., "Privacy-Preserving Queries over Relational Databases", In International Symposium on Privacy Enhancing Technologies Symposium, Jul. 21, 2010, pp. 75-92.

"International Preliminary Report on Patentability Issued in PCT Application No. PCT/US2016/023334", dated Mar. 1, 2017, 8 Pages.

"International Search Report and Written Opinion Issued in PCT Application No. PCT/US2016/023334", dated Dec. 6, 2016, 12 Pages.

Popa, et al., "CryptDB: Protecting Confidentiality with Encrypted Query Processing", In Proceedings of the Twenty-Third ACM Symposium on Operating Systems Principles, Oct. 23, 2011, pp. 85-100.

* cited by examiner

COMPUTING ON ENCRYPTED DATA USING DEFERRED EVALUATION

BACKGROUND

Data may be stored locally or remotely according to a variety of storage configurations and implementations. For instance, cloud computing is a recent development related to the deployment of remote servers and software networks that provide for centralized data storage and online access to resources and services, referred to as "cloud services." A set of cloud servers may host resources/services for a single user (a "tenant"), or for multiple related or unrelated users (a "multi-tenant" system). Similarly, data may be stored "on-site" by an entity, and may be accessed by that entity in that on-site data storage.

Data breaches are an increasing concern as more and more data is digitally stored. For example, data breaches are arguably the main deterrent for the adoption of cloud and other services for applications that manage sensitive, business critical information. On a public cloud, applications must guard against potentially malicious cloud administrators, malicious co-tenants, and other entities that can obtain access to data through various legal means. Since the compute and storage platform itself cannot be trusted, any data that appears in cleartext (data that is not encrypted) anywhere on the cloud platform (on disk, in memory, over the wire, etc.) has to be considered susceptible to leakage or malicious corruption. In vertical industries such as finance, banking, and healthcare, compliance requirements mandate strong protection against these types of threats.

Accordingly, in some cases, a database server may store encrypted data, but have no access to the encryption keys for security reasons. This guarantees that any data stored in the database is encrypted until it passes to the client application (e.g., an intermediate application managed by the client entity), which runs in a protected environment. To address handling queries to encrypted data, the database server may use homomorphic encryption schemes. Such encryption schemes allow operations to be performed directly on encrypted data without requiring encryption keys. For example, the encrypted sum of two values a and b may be computed directly from the encrypted values of a and b (E(a) and E(b)) without knowing their individual values. However, homomorphic encryption schemes are extremely expensive—performing operations on homomorphically encrypted values can be several orders of magnitude slower than operations on unencrypted data. Another set of encryption schemes known as partially homomorphic encryption (PHE) schemes permit a limited set of operations on encrypted data. These schemes are relatively fast but are restricted in the kinds of operations they permit. Due to these security requirements and encrypted data computing constraints, handling queries on databases in a secure and efficient manner is difficult to implement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for processing queries. A data server includes a query processor configured to receive a query from a database application, which was received by the database application from a requestor. The query is directed to a set of data stored at the data server. The query processor in the data sever includes a deferred evaluation determiner and a deferred expression determiner. The deferred evaluation determiner is configured to analyze the query, and to designate at least a portion of the query for deferred evaluation by the database application if a predetermined factor is met, such as the query including an operation on encrypted data that is not supported at the data server. The deferred expression determiner is configured to determine expression evaluation information for evaluating the query, or portion thereof, at the database application. The query processor provides the encrypted data and the expression evaluation information to the database application for evaluation. The database application provides the query results to the requestor.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant arts) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
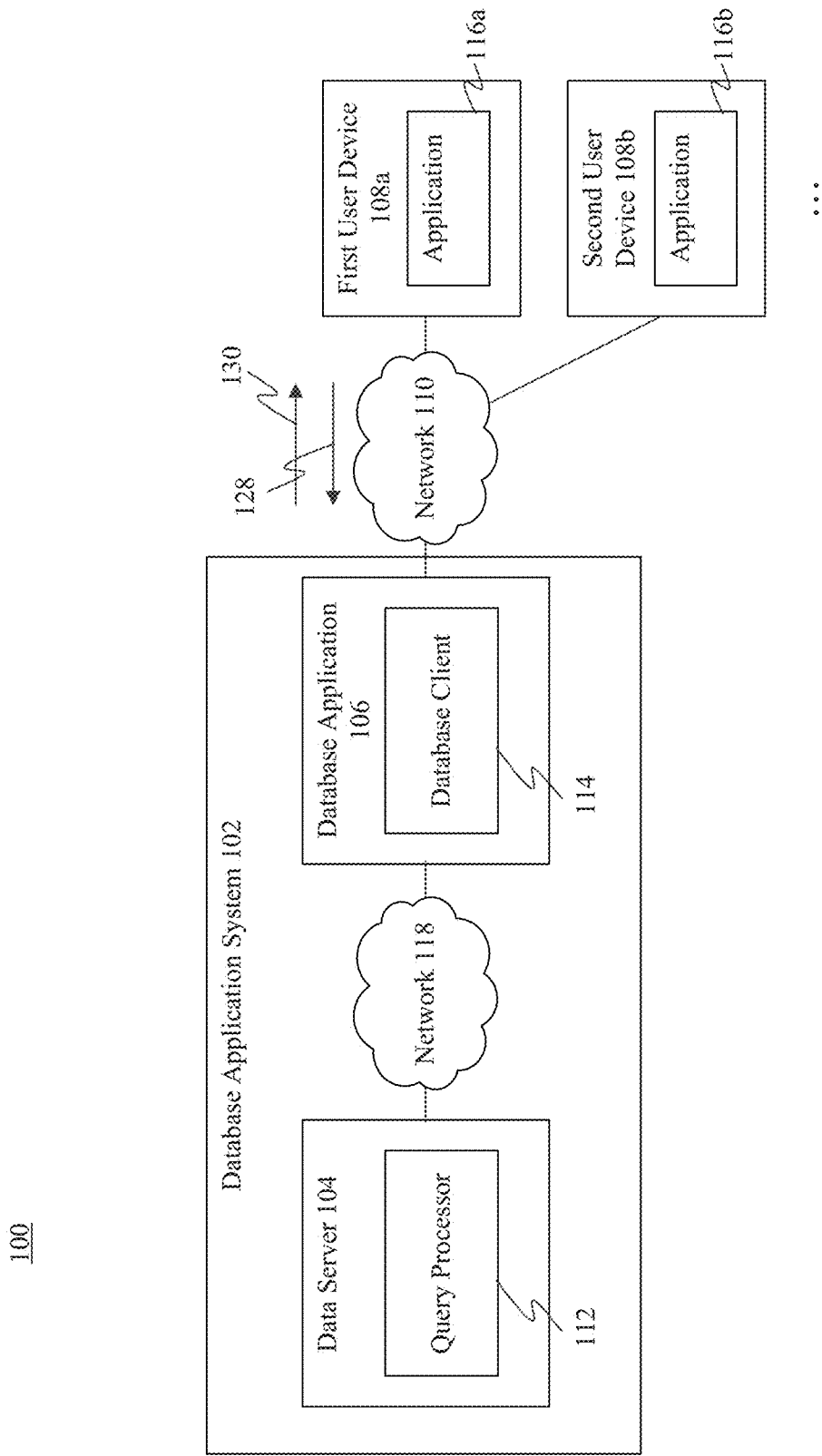
FIG. 1 shows a block diagram of a communication system in which a database application system processes user queries, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Deferred Evaluation of Queries

Embodiments described herein relate to the use of encryption to protect data hosted on untrusted platforms. While many conventional encryption schemes preserve data confidentiality, such encryption schemes typically do not permit an untrusted platform to run any computation on encrypted data. This significantly reduces the benefits of hosting applications on cloud platforms.

For example, a data server (e.g., a database server) may use homomorphic encryption schemes, partially homomorphic encryption (PHE) schemes, secure hardware, and/or other secure forms of computation to process some encrypted data, because the data server may not be considered "trusted," and thus does not have access to encryption keys used to encrypt the data. Homomorphic encryption schemes allow operations to be performed directly on encrypted data without requiring encryption keys. PHE schemes permit a restricted class of operations, but not all operations, to be performed directly on encrypted data without encryption keys.

However, homomorphic encryption schemes are extremely expensive, potentially being several orders of magnitude slower than operations on unencrypted data. PHE schemes may be faster than homomorphic encryption schemes, but are restricted in the types of operations they permit. Due to these security requirements and encrypted data computing constraints, handling queries on databases in a secure and efficient manner is difficult to implement.

According to embodiments, a query processing system is configured for deferred (also referred to as "lazy") evaluation of queries received from requestors. Deferred evaluation allows an untrusted server to perform arbitrary operations on encrypted data without requiring encryption keys. A data server that implements deferred evaluation delays the evaluation of expressions whose inputs are encrypted values. When the data server is asked to produce a value of a delayed expression (e.g. when it is evaluating the sum of two columns) for a query, the data server transfers the expression to a trusted client (e.g., database application). The trusted client has access to encryption keys that allows the trusted client to decrypt values associated with the query, evaluate the expression, and return the results in clear text to the requestor.

Figure 3:
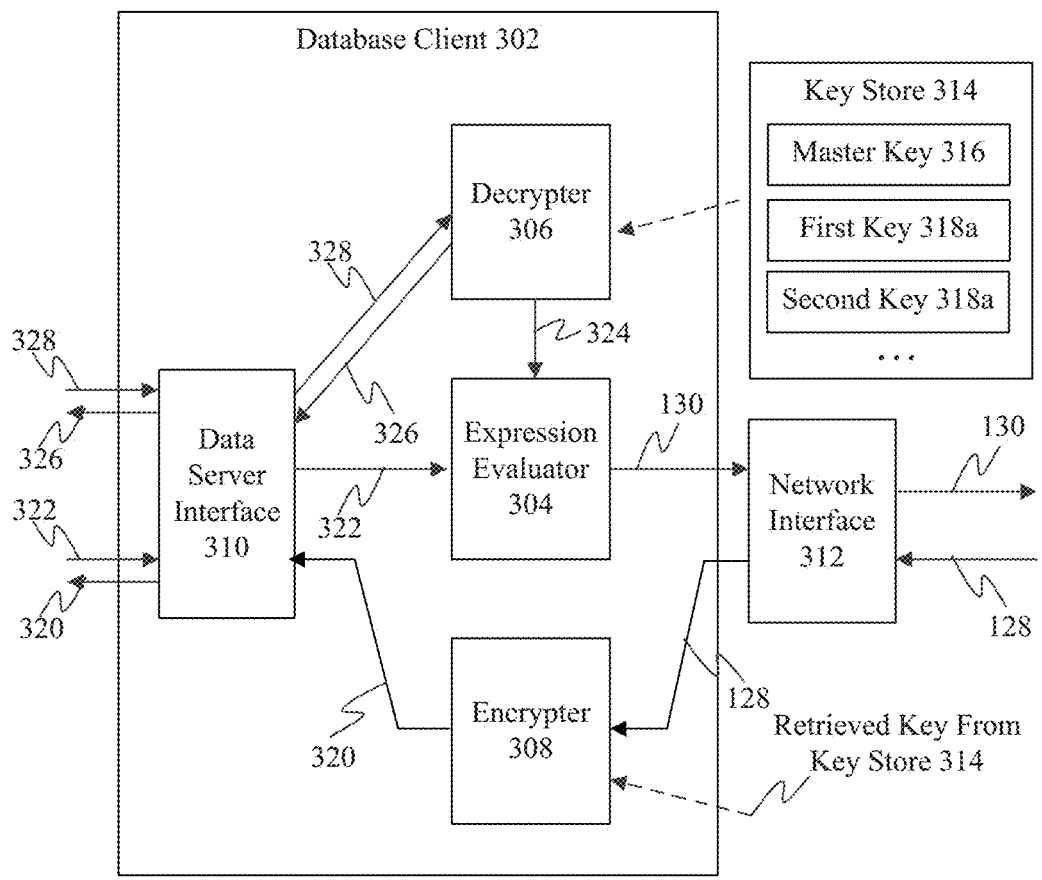
FIG. 3 shows a block diagram of a database application containing a database client configured to handle user queries, including evaluating queries deferred to the database client from a data server, according to an example embodiment.
Figure 6:
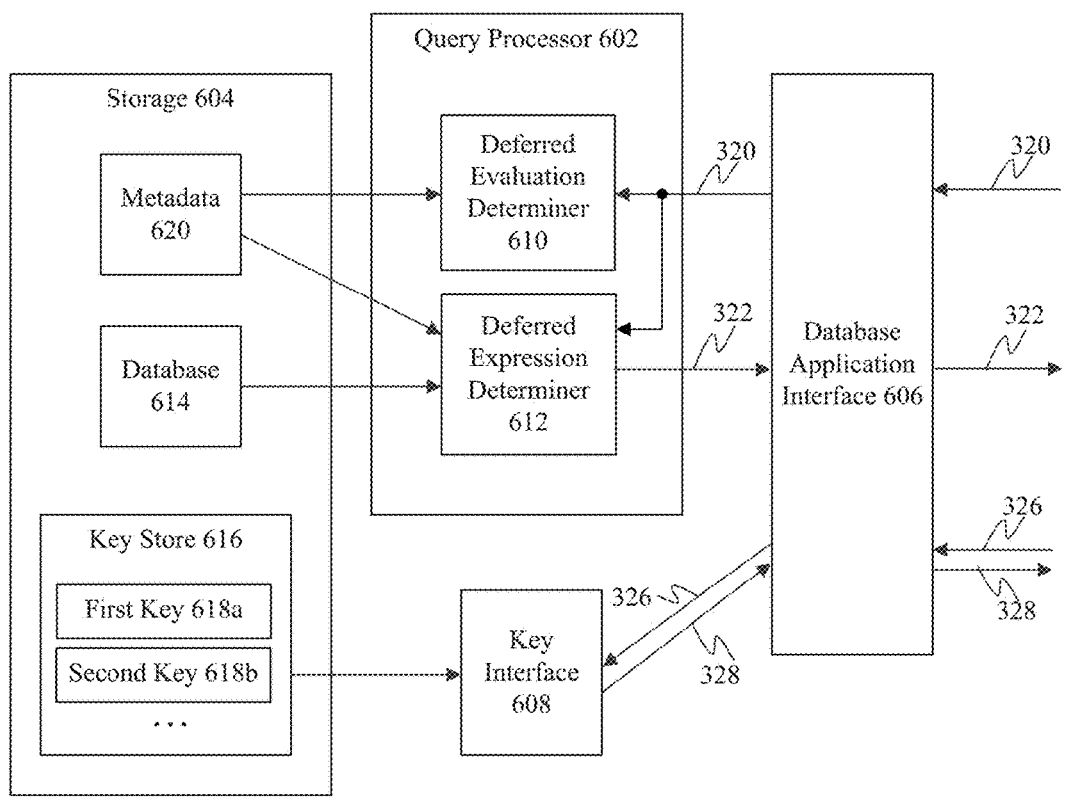
FIG. 6 shows a block diagram of a data server containing a query processor configured to process user queries, including deferring a query back to a database application for evaluation, according to an example embodiment.

Note that embodiments may be implemented on a database server, client, or middle tier, in any combination. The determination of whether a query is deferrable, and if so, how to simplify and execute the query (e.g., generate instructions, an expression tree, etc.) can be performed on the data server (e.g., as shown in FIGS. 1 and 6) or on the client. In order to make such a determination on the client, additional processing logic is located on the client (e.g., placing a deferred evaluation determiner and deferred expression determiner on the client). However, this makes the client side "fat" and such processing logic would be placed on each client, as opposed to having the processing logic just on the data server. Similarly, once the query is executed, the actual decryption of data, evaluation of the expression, and providing of the correct results to the client may be performed on the data server or the client (e.g., as shown in FIGS. 1 and 3). If performed on the data server, the data server is restricted from having access to the unencrypted keys and data.

An example advantage of using deferred evaluation to partition computation between a client and data server is that it permits "thin" clients in that metadata indicating which data is encrypted (e.g., which columns in SQL are encrypted) can be stored centrally with the data server. The data server can also store data encryption keys (which may be encrypted using a master key). Clients can retrieve data encryption keys on demand from the data server, decrypt them using the master key, decrypt data using the data encryption key, and evaluate expressions. In embodiments, the data server can also increase performance by using optimizations such as partial evaluation and memorization (the caching ("memorizing") of results of previous delayed evaluations so that a next time the same expression is to be evaluated on the same data, the data server does not have to go to the trusted client for the evaluation).

In an embodiment, such as with regard to SQL data servers and SQL clients (such as ADO.NET), the data server and client may be configured with the following modifications:

Data server side: (A) The data server may be configured with a mechanism for identifying encrypted inputs. For instance, a new data type (e.g. encrypted varbinary in SQL or Encrypted<T> in .NET) may be used along with a type system or static analysis that checks that this type is used correctly.

(B) Language primitives (such as arithmetic operators, string functions such as LTRIM, RTRIM, REPLACE) may be implemented that check if the type of any of the inputs are encrypted, and that defer evaluation (e.g. by generating a new encrypted value that encodes the expression that must be computed to obtain the real value). The result of deferred evaluation may be encoded as a value of type encrypted, which enables the composition of expressions. For instance, an example query is shown below:

SELECT REPLACE(e.FirstName, '.','') FROM Employee e.

If e.FirstName is encrypted, the result of the expression is an expression with the value of e.FirstName, the constant '.' and ' ' and the name of the function (REPLACE).

(C) A mechanism may be used to determine expressions that cannot be evaluated on the data server due to limitations in performing operations on encrypted data, and that can be lazily evaluated. The evaluation of such expressions may be delegated to a trusted client. It is noted that conditional expressions and expressions that have side-effects (such as DML statements in SQL) may not be lazily evaluated in some embodiments.

(D) A mechanism may be used to determine which expressions can be lazily evaluated profitably. Deferred evaluation can be used with a wide class of expressions. For example, in SQL, deferred evaluation can be used with filters, joins, aggregations, etc. However, using deferred evaluation with such expressions can cause significant performance degradation because all the inputs for the expression must be transferred to and from the client, which can increase transaction latencies/reduce throughput depending on the nature of the link between the client and the server. Therefore, deferred evaluation can be configured to be used selectively.

Client side: A library may be configured to parse the deferred expression, make calls to a cryptography interface (e.g., CryptoAPI) to decrypt encrypted values at the leaves of an expression tree, evaluate the rest of the expression, and return the result to the client.

Embodiments may be implemented in various environments. For instance, FIG. 1 shows a block diagram of a communication system in which a query processing system processes user queries, according to an example embodiment. As shown in FIG. 1, communication system 100 includes a database application system 102, a first user device 108a, and a second user device 108b, which are coupled together by a first network 110. Database application system 102 is configured to process user queries received from user devices 108a and 108b in a secure and efficient manner. Database application system 102 may be implemented in the form of one or more computing devices. Database application system 102 includes a data server 104 and a database application 106, which are coupled together by a second network 118. Data server 104 includes a query processor 112, and database application 106 includes a database client 114. First user device 108a includes an application 116a, and second user device 108b includes an application 116b. System 100 is further described as follows.

First and second user devices 108a and 108b may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™ etc.), a personal navigation assistant, a camera, or other type of mobile device (e.g., an automobile), or a stationary computing device such as a desktop computer or PC (personal computer). Although a pair of user devices are shown in FIG. 1, in other embodiments, other numbers of user devices may be present in system 100, including one or other numbers in the single digits, numbers in the tens, hundreds, thousands, or even greater numbers of user devices.

Data server 104 and database application 106 each include one or more computing devices configured as server devices. In one embodiment, data server 104 and database application 106 are included in different sets of one or more computing devices, and in another embodiment, data server 104 and database application 106 are included in a common set of one or more computing devices. Database application 106 may be a client or middle tier database application, and data server 104 may be a database server for the client. In embodiments, data server 104 may serve any number of database applications 106.

Each of data server 104, database application 106, first user device 108a, and second user device 108b may include at least one network interface that enables communications over one or both of networks 110 and 118. Such network interface(s) may include one or more of any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of networks 110 and 118 include a local area network (LAN), a wide area network (WAN), a personal area network (PAN), and/or a combination of communication networks, such as the Internet. When data server 104 and database application 106 are included in a same computing device, network 118 may not be present.

In an embodiment, one of first and second user devices 108a and 108b (requestors) may issue a query to database application system 102. The query may be caused to be issued by a person/user/customer interacting with an application executing on the user device, or automatically by an application executing on the user device. For instance, applications 116a and 116b at user devices 108a and 108b, respectively, may be interacted with by a user to cause a query to be submitted and/or may automatically cause a query to be submitted. Thus, applications 116a and 116b and user devices 108a and 108b may each be considered to be a type of requestor. Examples of applications 116a and 116b include browsers (e.g., that navigate to a website provided by database application 106), mobile or desktop apps, database-accessing applications, and any other type of applications capable of submitting queries to a query processing system.

In FIG. 1, an example query 128 is submitted by application 116a at first user device 108a to database application system 102. Query 128 may include an SQL (structured query language) query, or other type of query of a database managed by data server 104. Query 128 is transmitted over network 110 to be received by database application 106 of database application system 102. Database application 106 is considered a trusted entity with respect to the query. For example, in one embodiment, database application 106 may be managed by a bank (or other service provider), and may provide a front end for receiving queries from customers of the bank (or other service provider). Thus, query 128 may include data considered sensitive by the user/requester, and/or may be configured to access data at data server 104 that is considered sensitive. Such data may be represented in cleartext (unencrypted) at database application 106. For instance, query 128 may be a request by a bank's customer to access his/her account data. Query 128 may include identifying information for the customer, such as their banking account number (in a banking context), their social security number, etc. Database client 114 processes query 128, and handles interactions with query processor 112 at data server 104 to have query 128 processed. For example, database client 114 may comprise an ADO.NET client library published by Microsoft Corporation, or other instance of a database interface at database application 106. Data server 104 is not considered to be a trusted entity with respect to query 128. For example, in one embodiment, data server 104 may be managed by a cloud-based storage provider unaffiliated with the owner of database application 106, or by other entity that stores data of users/customers of database application 106, but is not trusted with the data. As such, at least some data stored at data server 104 is encrypted so that the data may not be compromised at data server 104. In one example, data server 104 may comprise an instance of SQL SERVER®, published by Microsoft of Redmond, Wash., or may include an instance of an alternative database server mechanism (e.g., Oracle® Database published by Oracle Corporation of Redwood City, Calif., etc.).

Accordingly, in an embodiment, database client 114 may encrypt data (e.g., constant values) included in query 128, and transmit a version of query 128 that includes the encrypted data values to query processor 112 (through network 118, when present) for evaluation. The version of query 128 with encrypted data values therefore does not expose sensitive information at data server 104. For instance, query 128 may include a social security number (SSN) of a person. In this example, database client 114 processes query 128 to include the SSN in encrypted form, rather than the actual SSN, thereby protecting the SSN from being exposed at data server 104.

Query processor 112 analyzes the received query to determine whether the query can be processed at data server 104 with encrypted data values. In other words, in the current example, query processor 112 determines whether query 128 can be processed at data server 104 with the value of the SSN encrypted. If query processor 112 determines from analysis of the query that the query can be processed at data server 104 with encrypted data, query processor 112 evaluates the query to determine query results, which are then provided to database client 114. If query processor 112 determines from analysis of the query that the query cannot be processed at data server 104 with encrypted data (e.g., due to unsupported operations on encrypted data, etc.), query processor 112 generates expression evaluation information (e.g., instructions for evaluating one or more expressions; an expression tree that includes the encrypted data values as leaves, with operations of the query being in branches/intersections of branches of the tree; etc.). Query processor 112 transmits query information to database client 114 (through network 118, when present) providing the expression evaluation information, with any data retrieved by data server 104 for the query. Database client 114 may decrypt the encrypted data included in the query information, and evaluates the expression evaluation information to generate query results. Such deferral of the evaluation of the query by query processor 112 (at data server 104) to database client 114 (at trusted database application 106) is referred to as "deferred evaluation."

The query results generated by query processor 104 or database client 114 may be transmitted as query results 130 by database client 114 (from database application 106) to first user device 108a, through network 110.

Note that in an embodiment, if database client 114 does not have access to data encryption keys for encrypting data (of query 128) or decrypting data (of the query response from query processor 112), database client 114 may request the encryption keys from data server 104. Data server 104 may store the encryption keys, but in an encrypted form so that the encryption keys may not be used at data server 104 to compromise data of queries and/or database data. It is noted that in system 100, the encrypted data stored in columns at data server 104, as well as the encryption/decryption keys, never appear in cleartext on data server 104. Data server 104 may transmit the encrypted encryption keys to database client 114 on request, or automatically (e.g., with the query results). Database client 114 may decrypt the encrypted encryption/decryption keys using a master encryption key maintained at database application 106, and use the encryption keys to encrypt data (e.g., of query 128) and/or decrypt data (e.g., in the query response) as needed.

Accordingly, database application system 102 enables the secure and efficient handling of queries. Data can be maintained at data server 104 in an encrypted form. Queries received by database client 114 (at database application 106) can have their data encrypted by database client 114, and then can be provided for evaluation by query processor 112 with the encrypted data, thereby avoiding exposing actual data of the queries at data server 104. If a query cannot be processed on encrypted data by query processor 112, query processor 112 generates expression evaluation information based on the portions of the query that cannot be processed, which is provided to database client 114 with any retrieved database data. Database client 114 decrypts any encrypted data received with the expression evaluation information, and evaluates the expression evaluation information to generate query results. In this manner, no data is exposed at data server 104 in an unencrypted form (unless exposure of particular data is permissible), providing a high level of data security.

In embodiments, database application system 102 of FIG. 1 may be configured in various ways, and may operate in various ways, to enable such deferred evaluation. The next section (Section II.A) provides example embodiments for handling received queries at the database application side, followed by a section (Section II.B) providing example embodiments for processing queries at the database server side. These sections are followed by a section (Section III) describing exemplary computing device embodiments, and a section (section IV) providing additional embodiments.

A. Example Database Application Side Embodiments for Deferred Evaluation

Figure 2:
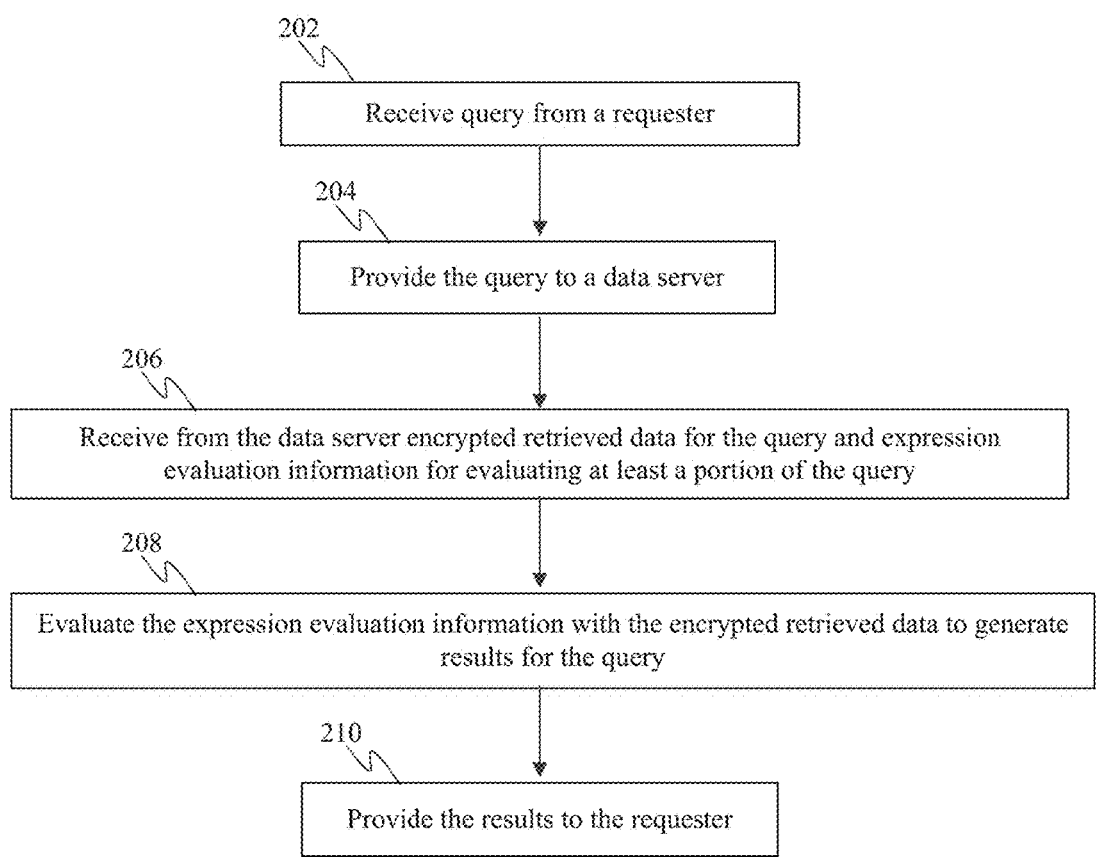
FIG. 2 shows a flowchart providing a process in a database application for handling user queries, including evaluating a query that was deferred to the database application from a data server, according to an example embodiment.

In embodiments, database application 106 and database client 114 may be configured in various ways to handle received queries using deferred evaluation. For instance, FIG. 2 shows a flowchart 200 providing a process in a database application for processing user queries to maintain data security, according to an example embodiment. Database client 114 of FIG. 1 may operate according to flowchart 200 in embodiments. For illustrative purposes, flowchart 200 is described below with respect to FIG. 3. FIG. 3 shows a block diagram of a database application 300 containing a database client 302 configured to handle user queries, including evaluating queries handed back to database client 302 from a data server for deferred evaluation, according to an example embodiment. Database application 300 is an example of database application 106, and database client 302 is an example of database client 114 of FIG. 1. As shown in FIG. 3, database application 300 includes database client 302, a network interface 312, and a key store 314. Database client 302 includes an expression evaluator 304, a decrypter 306, an encrypter 308, and a data server interface 310. Database application 300, database client 302, and flowchart 200 are described as follows.

Flowchart 200 of FIG. 2 begins with step 202. In step 202, a query is received from a requestor. For example, with reference to FIG. 3, network interface 312 of database application 300 may receive query 128 (e.g., from first user device 108a in FIG. 1), and may forward query 128 to be received by encrypter 308. Network interface 312 is a communication interface with a network (e.g., network 110 of FIG. 1), and further examples and description of network interfaces are provided elsewhere herein.

Query 128 is a query that a requester desires to be executed against data (e.g., in a database) managed by a data server (e.g., data server 104 of FIG. 1). Query 128 may include one or more operations on one or more variables and/or query parameter values that are accessed in data at the data server. Such operations may be defined to be performed on column data, performed in a predicate of the query (specifying a condition to be evaluated), etc.

For instance, in an SQL (structured query language) query, a declarative "Select" statement may be used to signify a query. Query 128 may list after the "Select" statement one or more database table columns to appear in the query results. Operations may be indicated to be performed on the columns (e.g., "column_1+column_2", etc.). A "From" clause may indicate one or more tables from which data is to be retrieved. A "Where" clause includes a comparison predicate, which restricts rows returned by the query. Many other types of types of clauses may be present in query 128, as would be known to persons skilled in the relevant arts.

For example, an example SSN (social security number)-based query is shown below:

SELECT FirstName, LastName, Base_Salary+Annual_Bonus FROM Employees WHERE SSN=12345678

According to this example, the query results will include data from the "FirstName" and "LastName" columns, and a sum of the "Base_Salary" and "Annual_Bonus" columns (row-by-row addition operations are performed on the "Base_Salary" and "Annual_Bonus" columns to generate the sum results). The "From" clause indicates that the indicated columns are selected from the "Employees" table stored in a database managed by the data server. The "Where" clause provides a restriction, indicating that data from the indicated columns of the indicated table is selected from one or more rows having a value in the "SSN" column equal to "12345678."

Note that in step 202, if there is data included in query 128, encrypter 308 may be configured to encrypt the data. For instance, encrypter 308 may access metadata stored at application 300, may communicate with the data server for such metadata, or may determine in another manner the encryption schemes and encryption keys to be used by encrypter 308 to encrypt the corresponding data of query 128 (e.g., particular parameter values, constants, and/or other types of data). As shown in FIG. 3, encrypter 308 generates a query 320, which contains the contents of query 128 with encrypted data.

In embodiments, encrypter 308 may be configured to implement one or more types of encryption schemes to encrypt plaintext data into ciphertext, as would be known by persons skilled in the relevant arts. Such encryption schemes may include public and/or private key encryption schemes, homomorphic encryption schemes (allows computations/operations to be performed on ciphertext), partially homomorphic encryption schemes (allows a particular set of computations/operations to be performed on ciphertext), deterministic encryption schemes (always produces the same ciphertext for a same plaintext and key), probabilistic encryption schemes (particular plaintext can encrypt to any one of a set of possible ciphertexts, chosen randomly during the encryption process), and/or other type of encryption scheme(s).

As shown in FIG. 3, key store 314 includes a master key 316, a first key 318a, a second key 318b, and any additional number of encryption keys. In some cases, an encryption key for encrypting data of query 128 may be present in key store 314. Thus, encrypter 308 may access the encryption key in key store 314, and use the encryption key to encrypt the data. In another embodiment, encrypter 308 may not have access to an encryption key at database application 300. Accordingly, encrypter 308 may be configured to request the encryption key from another source, such as the data server. In an embodiment, a data server may store one or more encryption keys, in encrypted form, that can be provided to encrypter 308 at database application 300. As such, in an embodiment, encrypter 308 may transmit a request for the encryption key to the data server (e.g., through data server interface 310), may receive the encryption key from the data server, and may use the encryption key to encrypt the data. A similar process for requesting a decryption key by decrypter 306 is described further below with respect to FIG. 4.

In one illustrative example, with respect to the above mentioned example SSN-based query, encrypter 308 may access metadata that indicates the SSN parameter value should be encrypted according to an encryption scheme X with an encryption key Y. Accordingly, encrypter 308 may generate query 320 to include the contents of the SSN-based query, with the parameter value "12345678" encrypted according to encryption scheme X using encryption key Y. In such an example, the parameter value "12345678" may be encrypted by encrypter 308 to the encrypted value of "!@#&HF %%". Accordingly, query 320 may express the SSN-based query as SELECT FirstName, LastName, Base_Salary+Annual_Bonus FROM Employees WHERE SSN=!@#&HF %%

Referring to flowchart 200 (FIG. 2), operation proceeds from step 202 to step 204.

In step 204, the query is provided to a data server. For example, as shown in FIG. 3, data server interface 310 may receive query 320 with encrypted data. Data server interface 310 is configured as a communication interface for communications with one or more data servers (and optionally with other entities). In some embodiments, data server interface 310 may not need to be present. Data server interface 310 is configured to provide (e.g., transmit) query 320 with encrypted data to a data server (e.g., over network 118 of FIG. 1).

In an embodiment, the data server is configured to analyze query 320 with encrypted data to determine whether query 128 can be evaluated at the data server on the encrypted data (e.g., if query 320 includes an operation on encrypted data that is unsupported at the data server). In the example of flowchart 200 in FIG. 2, it is assumed that the data server determines that query 320 includes at least one unsupported operation on encrypted data, and thus the data server cannot completely evaluate query 320. As such, operation proceeds from step 204 to step 206.

In step 206, encrypted retrieved data for the query and expression evaluation information representative of the query are received from the data server. For example, as shown in FIG. 3, data server interface 310 may receive deferred expression information 322, and may forward deferred expression information 322 to expression evaluator 304. In an embodiment, deferred expression information 322 includes expression evaluation information determined by the data server from query 320. Furthermore, deferred expression information 322 includes encrypted data retrieved from a database at the data server for query 320. The expression evaluation information indicates one or more operations to be performed by database client 302 on the received encrypted data to evaluate query 128. The expression evaluation information may have any suitable form, including the form of one or more expression trees, instructions, program code, an executable file or object, etc.

Accordingly, in addition to the expression evaluation information, deferred expression information 322 may include one or more row/column values retrieved from one or more specified tables, one or more values that are determined by one or more operations performed on retrieved data, etc. Deferred expression information 322 may include encrypted results (e.g., encrypted columns, etc.) where encrypted data is retrieved from tables and/or is generated from operations performed on encrypted values. Operation proceeds from step 206 to step 208.

In step 208, the expression evaluation information is evaluated with the encrypted retrieved data to generate results for the query. In an embodiment, the expression evaluation information received in deferred expression information 322 is evaluated for the encrypted data also received in deferred expression information 322. Decrypter 306 may receive deferred expression information 322 directly or from expression evaluator 304, and may decrypt the encrypted data to generate decrypted data 324. Expression evaluator 304 is configured to evaluate the expression evaluation information on decrypted data 324 to generate query results 130. Exemplary details of these operations by decrypter 306 and expression evaluator 304 are described as follows.

In embodiments, decrypter 306 may be configured to implement one or more types of decryption schemes to decrypt ciphertext into plaintext, as would be known by persons skilled in the relevant arts. For instance, decrypter 306 may implement decryption schemes to decrypt data encrypted according to any of the encryption schemes mentioned elsewhere herein or otherwise known. Note that in an embodiment, decrypter 306 and encrypter 308 may be included in a same functional block.

For instance, with respect to the above example SSN-based query, deferred expression information 322 may indicate an decryption scheme and key for any encrypted data included therein, such as the following:
  for encrypted FirstName data
    use decryption scheme W
    use decryption key Z In this example, decrypter 306 may decrypt FirstName data (e.g., a column of data containing first names of employees) using decryption scheme W with decryption key Z (note that a same data encryption key value may be used for related encryption and decryption schemes, in some cases). In one example provided for purposes of illustration, using decryption scheme W with encryption key Z, the received encrypted value "(&*^87&DF" may be decrypted by decrypter 306 to generate the decrypted value of "Samuel."

In some cases, a decryption key indicated in deferred expression information 322 may be present in key store 314. Thus, decrypter 306 may access the decryption key in key store 314, and use the decryption key to decrypt one or more parameters as directed by deferred expression information 322. Alternatively, deferred expression information 322 may include one or more decryption keys for decrypting the query results. Thus, decrypter 306 may use the decryption key(s) received with deferred expression information 322 to decrypt one or more data values as directed.

In still another embodiment, decrypter 306 may not have access to a decryption key at database application 300 that was indicated in deferred expression information 322 for encrypted data. Accordingly, decrypter 306 may be configured to request the decryption key from another source, such as the data server. In an embodiment, the data server may store one or more decryption keys, in encrypted form, that can be provided to decrypter 306 at database application 300.

Figure 4:
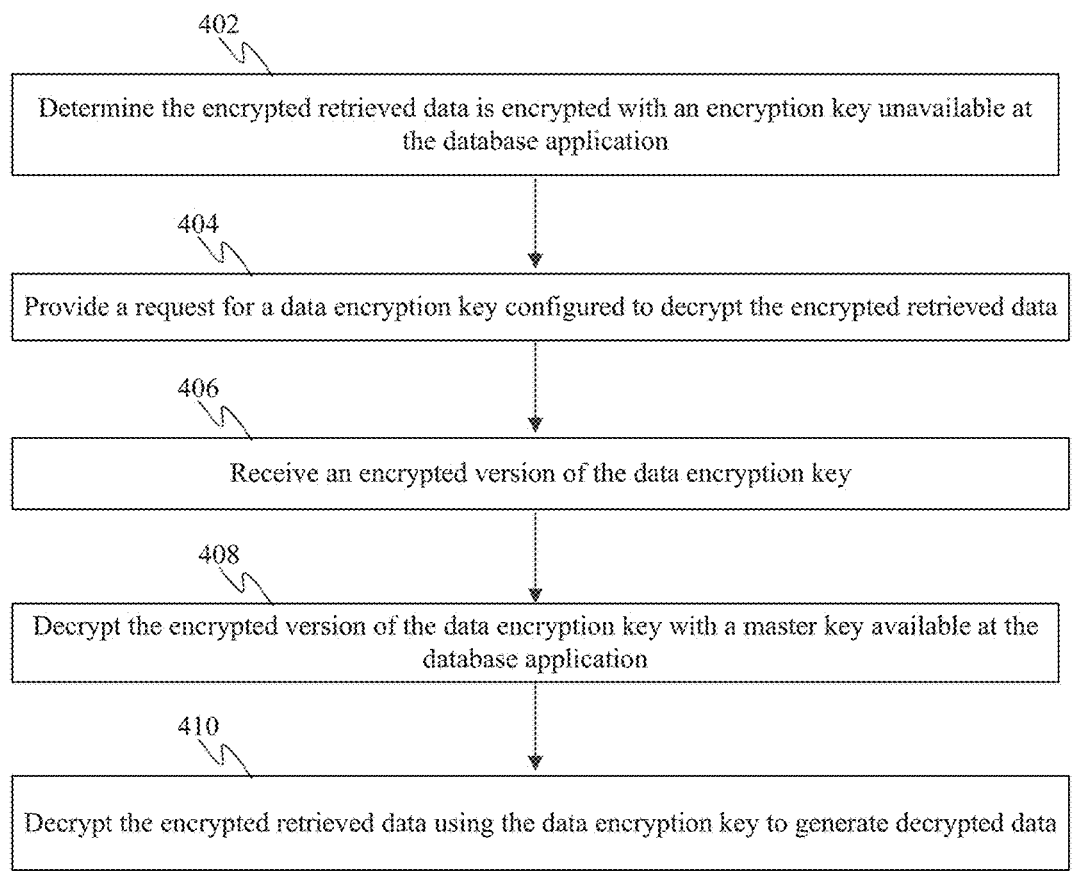
FIG. 4 shows a flowchart providing a process in a database application for retrieving a data encryption key from a data server for decrypting query data, according to an example embodiment.

For instance, in an embodiment, decrypter 306 may operate according to FIG. 4. FIG. 4 shows a flowchart 400 providing a process in a database application for retrieving a data encryption key from a data server for decrypting query results data, according to an example embodiment. Flowchart 400 is described as follows.

Flowchart 400 begins with step 402. In step 402, the encrypted retrieved data is determined to be encrypted with an encryption key unavailable at the database application. In an embodiment, as described above, results processor 324 may access decrypter 306 to decrypt encrypted data of deferred expression information 322 according to a specified decryption scheme and key. Decrypter 306 may determine that the decryption key is not available, such as by a failure to retrieve the decryption key from key store 314 or other location, by the decryption key not being provided in deferred expression information 322, etc.

In step 404, a request for the data decryption key configured to decrypt the encrypted retrieved data is provided to the data server. In an embodiment, decrypter 306 may generate a key request 326 that is provided by data server interface 310 to the data server. Key request 326 is a request for the decryption key that was unable to be retrieved at database application 300.

In step 406, an encrypted version of the data decryption key is received. In an embodiment, as shown in FIG. 3, data server interface 310 may receive an encrypted version of a decryption key 328 from the data server in response to key request 326, and may provide the encrypted version of decryption key 328 to decrypter 306.

In step 408, the encrypted version of the data decryption key is decrypted with a master key available at the database application. In an embodiment, decrypter 306 may use master key 316 to decrypt the encrypted version of decryption key 328. Decrypter 306 may optionally store the decrypted (or encrypted) version of decryption key 328 in key store 314 for subsequent use.

In step 410, the encrypted retrieved data is decrypted using the data encryption key to generate decrypted data. In an embodiment, decrypter 306 may use the decrypted version of decryption key 328 to decrypt encrypted data received from the data server according to the specified decryption scheme. Accordingly, decrypter 306 may provide the decrypted data to expression evaluator 304 as decrypted data 324.

Furthermore, expression evaluator 304 may be configured to evaluate the expression evaluation information in various ways. For instance, in an embodiment, expression evaluator 304 may evaluate one or more expression trees of the expression evaluation information in a similar manner as a conventional query processing engine may evaluate a received query. Alternatively, expression evaluator 304 may execute expression evaluation information (e.g., when in the form of program code or an executable file/object), may be configured to follow instructions provided in deferred expression information 322 to evaluate the expression evaluation information, or may evaluate the expression evaluation information in another manner. The operations expressed in the expression evaluation information are performed on any indicated columns and/or parameter values of decrypted data 324 to generate query results.

In an expression tree embodiment, expression evaluator 304 may be configured to iterate through the expression tree from the leaves (data values) inward, performing each operation in the expression tree after its input data values is/are known, working through each expression/level of the tree in this manner until the query results are generated. In another embodiment, the expression evaluation information may indicate a list of evaluation steps for the query, and may indicate a sequence for the evaluation steps (determined by the data server). Accordingly, in such an embodiment, expression evaluator 304 may work through the list of evaluation steps, evaluating an expression for each step, and performing the evaluation steps in the indicated sequence, until the query results are generated.

As such, expression evaluator 304 receives deferred expression information 322. Decrypter 306 decrypts any encrypted data of deferred expression information 322, and expression evaluator 304 evaluates the contained expression evaluation information to generate query results 130. Expression evaluator 304 may format query results 130 in any manner desired.

Referring back to flowchart 200 in FIG. 2, operation proceeds from step 208 to step 210.

In step 210, the results are provided to the requestor. As shown in FIG. 3, network interface 312 receives query results 130 from expression evaluator 304, and transmits query results 130 to the requester (e.g., over network 110, to application 116a at first user device 108a of FIG. 1). In this manner, user query 128 is handled in a secure and efficient manner, with any sensitive data being encrypted (ciphertext) at the data server (an untrusted entity), while being able to be in cleartext at database application 300 (a trusted entity). Operation of flowchart 200 may end after step 210.

B. Example Data Server Side Embodiments for Deferred Evaluation

Figure 5:
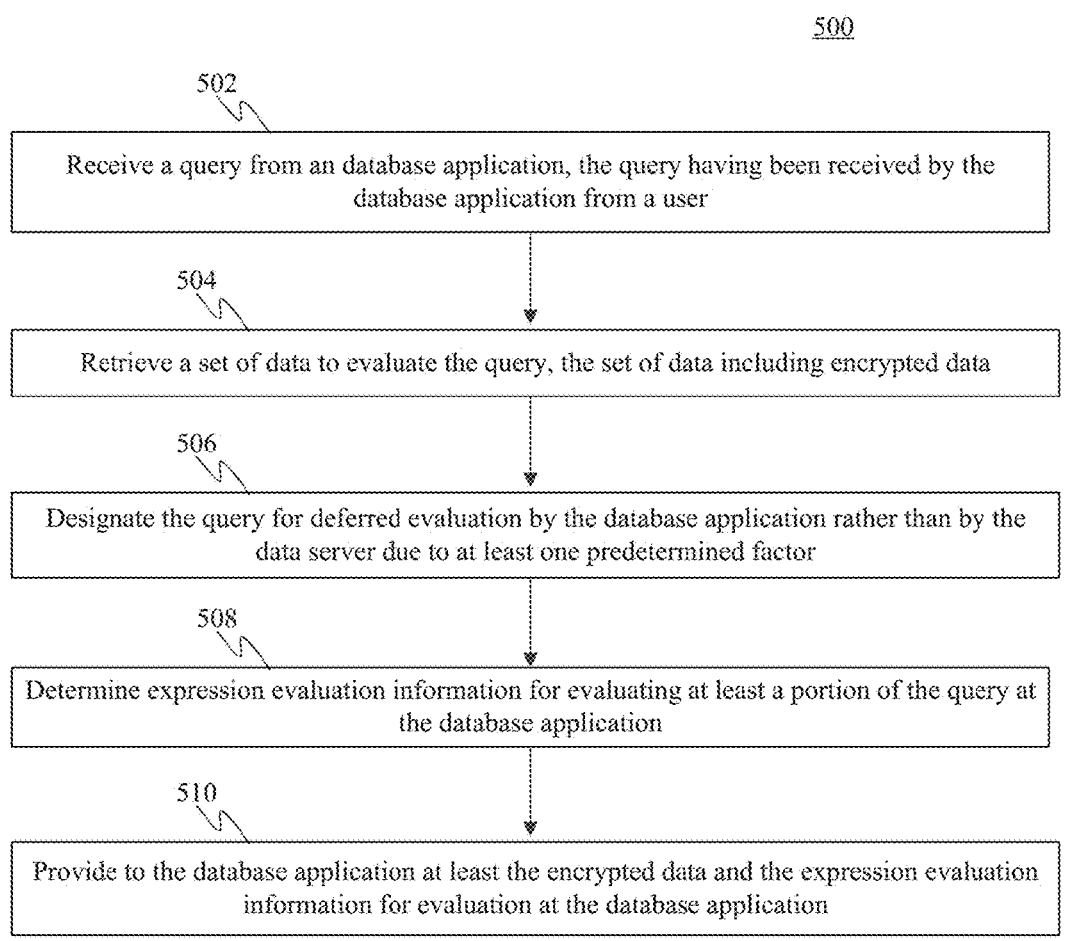
FIG. 5 shows a flowchart providing a process in a data server for processing user queries, including deferring evaluation of a query back to a database application, according to an example embodiment.

In embodiments, data server 104 and query processor 112 may be configured in various ways to handle received queries using deferred evaluation. For instance, FIG. 5 shows a flowchart 500 providing a process in a data server for deferring evaluation of query to a database application, according to an example embodiment. Query processor 112 may operate according to flowchart 500 in embodiments. For illustrative purposes, flowchart 500 is described below with respect to FIG. 6. FIG. 6 shows a block diagram of a data server 600 that contains a query processor 602 configured to communicate with a database application to process user queries, according to an example embodiment. Data server 600 is an example of data server 104, and query processor 602 is an example of query processor 112 of FIG. 1. As shown in FIG. 6, data server 600 includes query processor 602, storage 604, a database application interface 606, and a key interface 608. Query processor 602 includes a deferred evaluation determiner 610 and a deferred expression determiner 612. Storage 604 stores a database 614, a key store 616, and metadata 620. Data server 600, query processor 602, and flowchart 500 are described as follows. It is noted that the steps of flowchart 500 do not necessarily have to occur in the order shown in FIG. 5, but may occur in other orders.

Flowchart 500 of FIG. 5 begins with step 502. In step 502, a query is received from an database application, the query having been received by the database application from a user. For example, as shown in FIG. 6, database application interface 606 of data server 600 may receive query 320 (e.g., from database application 106 in FIG. 1, or database application 300 of FIG. 3), and may forward query 320 to be received by deferred evaluation determiner 610 and deferred expression determiner 612 of query processor 602. As described above, query 320 contains the contents of query 128, with encrypted data. Database application interface 606 is configured as a communication interface for communications with one or more database applications (and optionally with other entities). In some embodiments, database application interface 606 may not need to be present. Operation proceeds from step 502 to step 504.

Note that as described, the database application may have access to encryption keys for encrypting data of query 128 before transmitting query 128 as query 320 with encrypted data. Alternatively, as described above with respect to encrypter 308 of FIG. 3, the database application may transmit a request to data server 600 to request one or more data encryption keys for encrypting the data of query 128. In such an embodiment, key interface 608 in FIG. 6 may receive the key request (via data application interface 606), may retrieve the data encryption key(s) from key store 616, and may transmit the retrieved key(s) to the data application (via data application interface 606). The database application may then use the received data encryption key(s) to encrypt the data of query 128 into query 320. Note that the received data encryption key(s) may be encrypted, and therefore, prior to using, the database application may decrypt the encrypted data encryption key(s) using a master key at the database application.

In step 504, a set of data is retrieved to evaluate the query, the set of data including encrypted data. In an embodiment, deferred expression determiner 612 is configured to retrieve from database 614 any data referenced in query 320. For instance, deferred expression determiner 612 may retrieve one or more data values, one or more entire table columns, and/or one or more entire tables, as identified in query 320.

For instance, with respect to the above example SSN-based query, deferred expression determiner 612 may retrieve the data values in the FirstName, LastName, Base_Salary, and Annual_Bonus columns of the Employees table corresponding to the encrypted social security number of !@#&HF %%. The data values retrieved from the Employees table from each of these columns may be encrypted according to the same or different encryption schemes.

In step 506 of flowchart 500, the query is designated for deferred evaluation by the database application rather than by the data server due to at least one predetermined factor. In an embodiment, deferred evaluation determiner 610 is configured to analyze query 320 to determine whether query 320 can be evaluated by query processor 602. In an embodiment, the analysis may indicate that query processor 602 cannot evaluate query 320 for one or more reasons (predetermined factors). For instance, in an embodiment, query processor 602 may not be able to evaluate query 320 because query 320 includes an operation on encrypted data that is not supported by query processor 602. If query 128 can be evaluated on encrypted data values, query processor 602 can evaluate query 128 in a conventional or other fashion, and operation of flowchart 500 can cease. In such case, query processor 602 can return results of query 320 to the database application, to be returned to the requestor. However, if deferred evaluation determiner 610 determines that query 320 cannot be evaluated on encrypted data values, deferred evaluation determiner 610 is configured to designate query 320 for deferred evaluation. In such case, operation of flowchart 500 continues at step 508.

Figure 7:
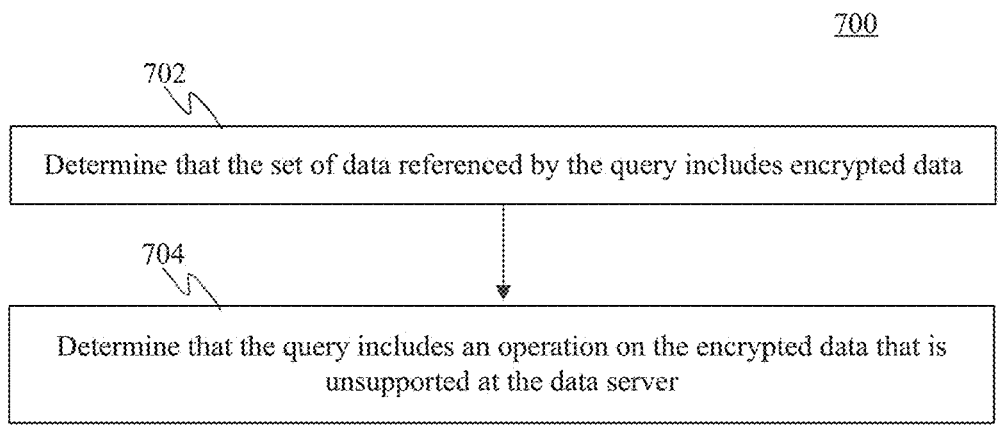
FIG. 7 shows a flowchart providing a process in a query processor for designating a query for deferred evaluation, according to an example embodiment.

Accordingly, in an embodiment, deferred evaluation determiner 610 may analyze query 320 to determine whether query 320 can be evaluated on encrypted data values. This analysis may be performed in various ways. For example, in an embodiment, deferred evaluation determiner 610 may make this determination according to FIG. 7. FIG. 7 shows a flowchart 700 providing a process in a query processor for designating a query for deferred evaluation, according to an example embodiment. Flowchart 700 is described as follows.

In step 702 of flowchart 700, it is determined whether the set of data referenced by the query includes encrypted data. In an embodiment, deferred evaluation determiner 610 is configured to determine whether the data referenced by query 320 includes encrypted data. Deferred evaluation determiner 610 may make this determination in various ways. For instance, in an embodiment, deferred evaluation determiner 610 may access metadata 620. Metadata 620 includes metadata (data describing data) indicating which data in database 614 (e.g., which columns) is/are encrypted, what the particular encryption scheme is for each data (e.g., for each column), and what is the encryption key for each data. Deferred evaluation determiner 610 may use metadata 620 to determine whether the set of data referenced by query 320 is encrypted, and if so, by what encryption schemes the set of data is encrypted. For instance, for one or more encrypted columns in database 614 referenced by query 320, deferred evaluation determiner 610 may examine metadata 620 to determine the encryption scheme for the column(s). If the set of data referenced by query 320 is not encrypted, then query processor 602 can evaluate query 128 in a conventional or other fashion. If the set of data referenced by query 320 includes encrypted data, operation proceeds from step 702 to step 704.

In step 704, it is determined whether the query includes an operation on the encrypted data that is unsupported at the data server. In an embodiment, deferred evaluation determiner 610 is configured to determine whether the operations expressed in query 320 (if any) may be performed on the referenced data (e.g., individual data values, columns of data, etc.) when encrypted according to their particular encryption schemes.

In an embodiment, for each type of operation (e.g., addition, subtraction, multiplication, division, etc.) that may be present in query 320, a record is maintained of what types of encrypted inputs the operation can operate upon, if any. For instance, deferred evaluation determiner 610 may store an operation table or other data structure that indicates which operations can be performed on what types of encrypted data as inputs, if any, or may use another technique to maintain a record of which operations can be performed on what types of encrypted data. Such data structure may be stored in storage 604, or elsewhere.

In an embodiment, such a table may include information regarding one or more of the following types of encryption schemes (and/or alternative or further encryption schemes): "randomized encryption", where operations cannot be performed on the encrypted data (other than storing and retrieving the encrypted data); "deterministic encryption," where just the equality operation can be performed on the encrypted data (storing and retrieving the encrypted data from storage can be performed); and "additive encryption", where just INTEGER additions can be performed on the encrypted data (storing and retrieving the encrypted data from storage can be performed).

In an embodiment, query 320 may be converted by deferred evaluation determiner 610 (or deferred expression determiner 612) into the form of an expression tree, or may be received from the database application already in this form. In an expression tree representation, each parameter value or other type of variable may be set as a "leaf" of the tree that branches inward, and the expressions/operations may be at intersections of the branches of the tree. Each expression of the tree receives one or more of a parameter value, a variable, and/or the solution of a prior evaluated expression as input values, and generates an expression solution as output. Thus, deferred evaluation determiner 610 may begin evaluation of the expression tree at the leaves, and may traverse inward to analyze the inputs of each expression/operation, until final result(s) is/are determined for the expression tree. If deferred evaluation determiner 610 determines that an expression/operation receives an input value that is encrypted, and it is known (e.g., from referencing the above mentioned operation table, etc.) that the particular expression/operation cannot be evaluated on that particular type of encryption (or on encrypted data at all), the analysis fails for that expression/operation, and that particular expression/operation of query 320 is designated for deferred evaluation. Additional expressions/operations of query 320 may be similarly designated for deferred evaluation. If all operations in the expression tree are determined to be able to be evaluated on their inputs, even when their inputs are encrypted, then query 320 can be evaluated on encrypted data by query processor 602 in a conventional or other manner.

Note that in some cases, one or more expressions/operations of query 320 may be determined that cannot be evaluated at the data server and cannot be evaluated at the client. In such a case, deferred evaluation determiner 610 may generate a fail report for query 320 (which may be provided to the requestor), and processing of query 320 may be ended.

For purposes of illustration, the above example SSN-based query is repeated below:

SELECT FirstName, LastName, Base_Salary+Annual_Bonus FROM Employees WHERE SSN=!@#&HF%%

In an embodiment, deferred evaluation determiner 610 may evaluate whether this example query is to be designated for deferred evaluation according to the following actions:

(a) Determine which data referenced by the query is encrypted. In this example, by checking in metadata 620, deferred evaluation determiner 610 may determine that Base_Salary and Annual_Bonus are of type INT (integer) and SSN is of type CHAR (characters), SSN is encrypted in database 614 according to a deterministic encryption scheme X, and Base_Salary and Annual_Bonus are encrypted according to a randomized encryption scheme Y.

(b) Confirm that the SSN column in database 614 is encrypted with an encryption scheme that supports the equality (=) operation. The SSN column is identified/inferred from the query. The confirmation may be performed by checking metadata 620 for the encryption scheme for SSN, which in this example is deterministic encryption scheme X. Deterministic encryption schemes do support equality, so no failure occurs with respect to the SSN column (randomized encryption schemes do not support equality, because the same encryption result is not always generated, so if the encryption scheme for SSN had been a randomized scheme, this check would have failed).

(c) Confirm that the Base_Salary and Annual_Bonus columns in database 614 are encrypted with an encryption scheme that supports the addition operation. This may be performed by checking metadata 620 for the encryption scheme(s) for Base_Salary and Annual_Bonus, which in this example are randomized encryption scheme Y. In this example, randomized scheme Y does not support the addition operation, so a failure occurs with respect to the Base_Salary and Annual_Bonus columns.

Accordingly, this example SSN-based query cannot be evaluated on encrypted data by query processor 603 because there is at least one unsupported operation on encrypted data. As such, deferred evaluation determiner 610 is configured to designate the query for deferred evaluation by the database application.

When query 320 is designated for deferred evaluation by deferred evaluation determiner 610, operation proceeds from step 506 to step 508 (FIG. 5).

In step 508, expression evaluation information is determined for evaluating at least a portion of the query at the database application. In embodiments, when query 320 is designated for deferred evaluation, deferred expression determiner 612 is configured to determine expression evaluation information for evaluating query 320 at database application. In an embodiment, the expression evaluation information indicates one or both of: (a) one or more encryption schemes and encryption keys for encrypted data retrieved for the query at the data server and provided to the database application, and (b) one or more operations to be performed by the database application to evaluate the query. The expression evaluation information may have any suitable form, including the form of one or more expression trees, instructions, program code, an executable file or object, etc. When expression evaluation information has the form of multiple expression trees, the multiple trees can be independent from each other or have dependencies between them that do or do not require a specific order of execution. For example, deferred expression determiner 612 may provide the condition of an IF statement to be evaluated by the client as first expression tree, and may provide the expressions/statements inside the IF and ELSE portions as one or more further expression trees, such that the expression tree of the IF condition is first evaluated by the client, and the IF or ELSE clause expression tree(s) can be subsequently evaluated.

The operations to be performed by the database application may be defined in the expression evaluation information in various ways, including in terms of one or more evaluation steps (operations) for the query to be performed by the database application, and a sequence in which the evaluation steps are to be performed by the database application. The database application may be instructed to perform all operations of query 320. Alternatively, in some other cases, a portion of the query (e.g., unrelated to unsupported operations on encrypted data) may be evaluated at the data server, and the database application is instructed to perform the remaining portions of the query (related to unsupported operations on encrypted data).

Figure 8:
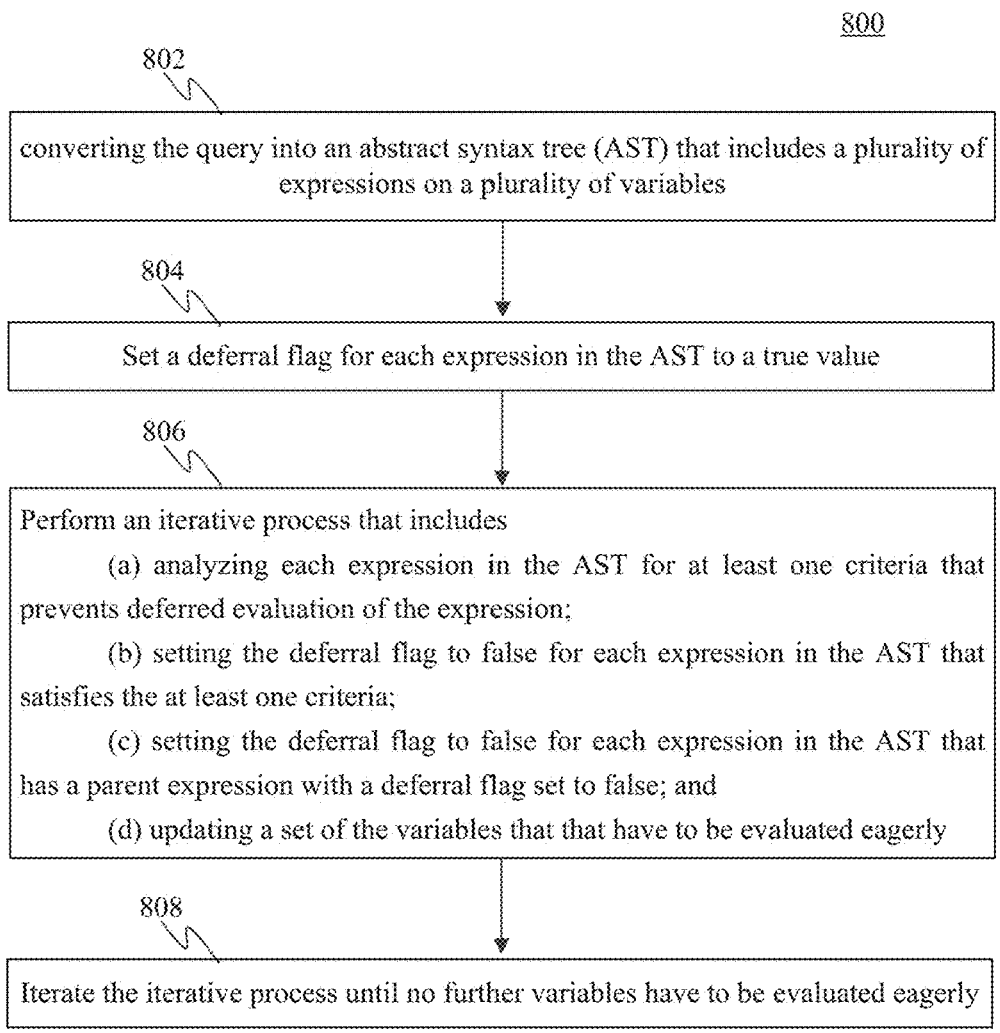
FIG. 8 shows a flowchart providing a process in a query processor for identifying expressions in a query that can be deferred to a database application for evaluation, according to an example embodiment.

Deferred expression determiner 612 may be configured to generate the expression evaluation information in various ways. For instance, FIG. 8 shows a flowchart 800 providing a process in a query processor for identifying expressions in a query that can be deferred to a database application for evaluation, according to an example embodiment. In an embodiment, deferred expression determiner 612 may operate according to flowchart 800. Flowchart 800 is described as follows.

Flowchart 800 begins with step 802. In step 802, the query is converted into an abstract syntax tree (AST) that includes a plurality of expressions on a plurality of variables. In an embodiment, deferred expression determiner 612 converts the components of query 320 into an abstract syntax tree (AST) representation. According to an AST representation, each parameter value or other type of variable of query 320 may be set as a "leaf" of the tree that branches inward, and the expressions/operations may be at intersections of the branches of the tree. Each expression of the tree receives one or more of a parameter value, a variable, and/or the solution of a prior evaluated expression as input values, and generates an expression solution as output.

In step 804, a deferral flag is set for each expression in the AST to a true value. In an embodiment, deferred expression determiner 612 associates a deferred evaluation flag (in one example, the flag "IsDeferred") with each expression in each AST. Each deferred evaluation flag indicates whether the expression associated therewith can be deferred to a client by database server 600. Initially, the analysis assumes that all expressions can be deferred to the client, which is indicated by setting the value of the deferred evaluation flag to a true value (e.g., "true") for all expressions.

In step 806, an iterative process is performed that includes: (a) analyzing each expression in the AST for at least one criteria that prevents deferred evaluation of the expression; (b) setting the deferral flag to false for each expression in the AST that satisfies the at least one criteria; (c) setting the deferral flag to false for each expression in the AST that has a parent expression with a deferral flag set to false; and (d) updating a set of the variables that have to be evaluated eagerly.

Thus, in an embodiment, deferred expression determiner 612 is configured to perform an iterative process at least one time. The iterative process includes (a)-(d), described as follows:

(a) Analyzing each expression in the AST for at least one criteria that prevents deferred evaluation of the expression. In embodiments, deferred expression determiner 612 may analyze each expression in the AST generated for query 320 to determine whether evaluation of the expression can be deferred to the database application. Deferred expression determiner 612 may analyze the AST for any number of types of such criteria that prevent deferred evaluation of each expression.

Figure 9:
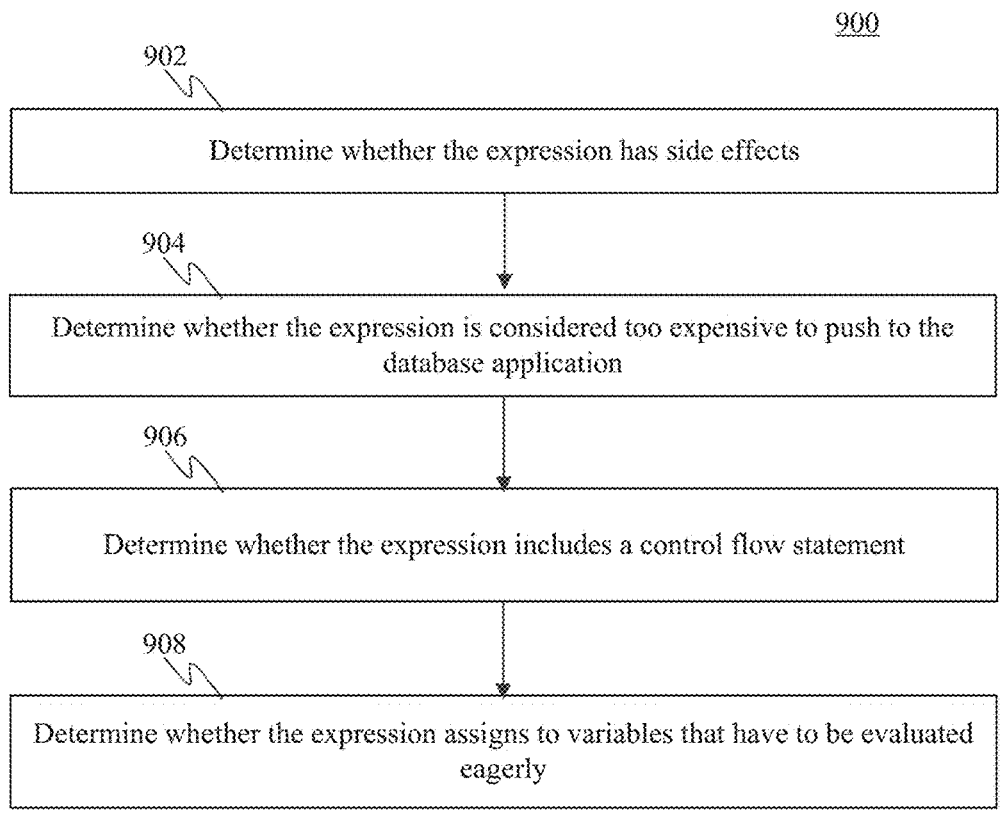
FIG. 9 shows a flowchart providing a process in a query processor for analyzing expressions of a query for criteria that prevents deferred evaluation, according to an example embodiment.

For example, in an embodiment of (a), deferred expression determiner 612 may operate according to FIG. 9. FIG. 9 shows a flowchart 900 providing a process in a query processor for analyzing expressions of a query for criteria that prevents deferred evaluation, according to an example embodiment. In embodiments, deferred expression determiner 612 may be configured to perform any one or more of the steps of flowchart 900 and/or may analyze expressions for further or alternative types of criteria that prevent deferred evaluation. Flowchart 900 is described as follows.

In step 902, whether the expression has side effects is determined. In embodiments, deferred expression determiner 612 analyzes each expression for side effects. "Side effects" mean that the expression includes an insert statement, a delete statement, an update statement, and/or other statement that causes a change to data of database 614.

In step 904, whether the expression is considered too expensive to push to the database application is determined. In embodiments, deferred expression determiner 612 analyzes each expression to determine whether the expression is deemed too expensive to be pushed to the client. For example, deferred expression determiner 612 may maintain a list of operations/expressions that are predetermined (e.g., by a database administrator, a developer, and IT admin, etc.) to be expensive operations, such as operations that can cause poor performance (e.g., high latency) due to needing additional resources at the client to be performed. Examples of expressions/operations that may be predetermined to be expensive include filters, joins, sorts, etc. Examples of expressions/operations that tend to not be considered expensive include scalar operations (e.g., addition, subtraction, multiplication, division, etc.).

In step 906, whether the expression includes a control flow statement is determined. In embodiments, deferred expression determiner 612 analyzes each expression to determine whether the expression is a control flow statement, such as an "if" statement, a "while" statement, or other type of conditional statement.

In step 908, whether the expression assigns to variables that have to be evaluated eagerly is determined. In embodiments, deferred expression determiner 612 analyzes each expression to determine whether the expression assigns to a variable that has to be evaluated eagerly, meaning that the evaluation of the variable cannot be deferred.

Note that flowchart 900 is provided for purposes of illustration, and in alternate embodiments, any one or more of steps 902, 904, and 906 may be used as criteria to determine whether deferred evaluation of the corresponding operation/expression in query 320 is prevented.

(b) Setting the deferral flag to false for each expression in the AST that satisfies the criteria. In embodiments, deferred expression determiner 612 is configured to set the deferred evaluation flag to the false value for any one or more of the criteria determined above in (a) for any expression of query 320. In the example of flowchart 900 in FIG. 9, this includes setting the deferred evaluation flag to the false value for expressions that have side effects (step 902), that are deemed too expensive to push to the client (step 904), that are control flow statements (step 906); and/or assign to variables that have to be evaluated eagerly (step 908).

(c) Setting the deferral flag to false for each expression in the AST that has a parent expression with a deferral flag set to false. In an embodiment, deferred expression determiner 612 is configured to propagate the value of the deferred evaluation flag from each parent expression to each child expression in the AST. If a parent of an expression cannot be subject to deferred evaluation, then the child cannot be subject to deferred evaluation either. Thus, this propagation involves propagating the value of the deferred evaluation flag from parent expressions having a deferred evaluation flag with the false value to child expressions having a deferred evaluation flag with the true value. Note that this propagation is monotonic in that once the deferred evaluation flag is set to the false value for an expression (either through propagation from the parent or because the expression itself cannot be subject to deferred evaluation as determined in (a)-(b) above), then it can never be re-set to the true value.

(d) Updating a set of the variables that have to be evaluated eagerly. In an embodiment, deferred expression determiner 612 is configured to update a set of variables that must be evaluated eagerly based on the results of (a)-(c). If any additional variables are discovered for eager evaluation as a result of (a)-(c), the additional variable(s) are added to the set.

In step 808, the iterative process is iterated until no further variables have to be evaluated eagerly. In an embodiment, the set of variables that have to be evaluated eagerly, as set in the last pass of (d), is analyzed by deferred expression determiner 612. If deferred expression determiner 612 determines that at least one new variable that must be evaluated eagerly was discovered during the preceding iteration of (d), deferred expression determiner 612 performs another iteration of step 806. However, if deferred expression determiner 612 determines that no new variables that must be evaluated eagerly were discovered during the preceding iteration of (d), the deferred evaluation analysis concludes and operation of flowchart 800 ceases.

The results of flowchart 800 includes the value of the deferred evaluation flag for every expression in the AST of query 320. Each expression/operation of the AST of query 320 that has the deferral flag set to true can be evaluated at the database application (deferred evaluation). Each expression/operation of the AST of query 320 that has the deferral flag set to false cannot be evaluated at the database application, and instead is evaluated by query processor 602.

Accordingly, deferred expression determiner 612 generates deferred expression information 322 to indicate at least a portion of the AST of query 320 and to include the data retrieved for query 320 from database 614. The provided AST indicates one or more expressions/operations to be performed by the database application on the retrieved data, which includes encrypted data. In an embodiment, query processor 602 may have evaluated one or more expressions of the AST (that could not be deferred), and includes the evaluation results in the provided AST. Deferred expression determiner 612 may also indicate an order for performing the expressions/operations of the provided AST (e.g., starting with operations/expressions having known input values (e.g., at leaves of the AST), and working inward (e.g., traversing the branches of the AST) as the inputs to subsequent operations/expressions become determined).

Referring back to FIG. 5, in step 510, at least the encrypted data and the expression evaluation information are provided to the database application for evaluation at the database application. For example, as shown in FIG. 6, deferred expression determiner 612 generates deferred expression information 322, which includes the generated expression evaluation information (e.g., the AST, instructions, etc.) and the set of encrypted data retrieved for the query from database 614. Deferred expression information 322 is provided to database application interface 606, which transmits deferred expression information 322 to the database application. The database application may evaluate the expression evaluation information with the set of encrypted data to generate query results 130, as described further above (e.g., step 208 of FIG. 2).

In an embodiment, deferred expression determiner 612 may indicate in deferred expression information 322 one or more decryption keys for decrypting the encrypted data. In this manner, the database application may decrypt any portion of deferred expression information 322 that is encrypted, prior to evaluating the expression evaluation information (e.g., step 208 of FIG. 2) to generate query results 130, which are provided to the requestor (e.g., step 210 of FIG. 2).

As described above, the database application may have access to the decryption keys used to decrypt the query results. In another embodiment, deferred expression determiner 612 may include copies of the decryption keys in deferred expression information 322. In still another embodiment, the database application may have to request copies of the data decryption keys from data server 600.

Figure 10:
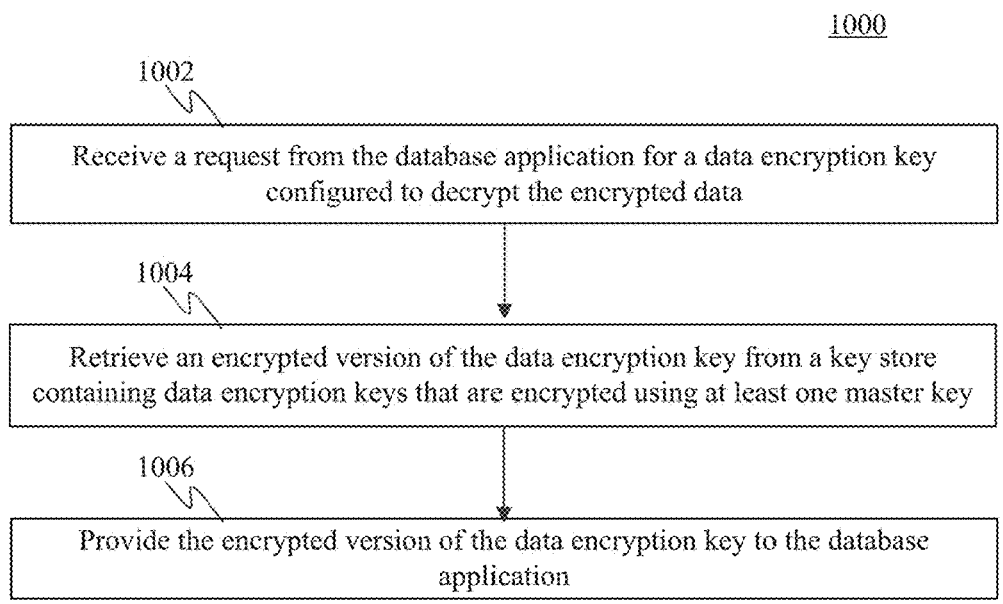
FIG. 10 shows a flowchart providing a process in a data server for servicing a request for a data encryption key by a database application, according to example embodiments.

For instance, FIG. 10 shows a flowchart 1000 providing a process in a data server for servicing a request for a data encryption key by a database application, according to example embodiments. Flowchart 1000 is described as follows.

Flowchart 1000 begins with step 1002. In step 1002, a request is received from the database application for a data encryption key configured to decrypt the encrypted data. The database application may generate key request 326, which is received and forwarded by database application interface 606 to key interface 608. Key request 326 is a request for a decryption key that was unable to be retrieved at the database application.

In step 1004, an encrypted version of the data encryption key is retrieved from a key store containing data encryption keys that are encrypted using at least one master key. In response to key request 326, key interface 608 may retrieve one or more data decryption keys from key store 616 that are specified in key request 326, including decryption key 328.

In step 1006, the encrypted version of the data encryption key is provided to the database application. In an embodiment, as shown in FIG. 6, key interface 608 may provide decryption key 328 (which is encrypted) to database application interface 606, which provides decryption key 328 to the database application. The database application may decrypt decryption key 328 using the master key, and may use the decrypted key to decrypt data included in deferred expression information 322.

III. Example Mobile and Stationary Device Embodiments

Database application system 102, data server 104, database application 106, first user device 108a, second user device 108b, query processor 112, database client 114, application 116a, application 116b, database application 300, database client 302, expression evaluator 304, decrypter 306, encrypter 308, data server interface 310, data server 600, query processor 602, database application interface 606, key interface 608, deferred evaluation determiner 610, deferred expression determiner 612, flowchart 200, flowchart 400, flowchart 500, flowchart 700, flowchart 800, flowchart 900, and flowchart 1000 may be implemented in hardware, or hardware combined with software and/or firmware. For example, database application system 102, data server 104, database application 106, query processor 112, database client 114, application 116a, application 116b, data server 104, database application 300, database client 302, expression evaluator 304, decrypter 306, encrypter 308, data server 600, query processor 602, deferred evaluation determiner 610, deferred expression determiner 612, flowchart 200, flowchart 400, flowchart 500, flowchart 700, flowchart 800, flowchart 900, and/or flowchart 1000 may be implemented as computer program code/instructions configured to be executed in one or more processors and stored in a computer readable storage medium. Alternatively, database application system 102, data server 104, database application 106, first user device 108a, second user device 108b, query processor 112, database client 114, application 116a, application 116b, database application 300, database client 302, expression evaluator 304, decrypter 306, encrypter 308, data server interface 310, data server 600, query processor 602, database application interface 606, key interface 608, deferred evaluation determiner 610, deferred expression determiner 612, flowchart 200, flowchart 400, flowchart 500, flowchart 700, flowchart 800, flowchart 900, and/or flowchart 1000 may be implemented as hardware logic/electrical circuitry.

For instance, in an embodiment, one or more, in any combination, of database application system 102, data server 104, database application 106, first user device 108a, second user device 108b, query processor 112, database client 114, application 116a, application 116b, database application 300, database client 302, expression evaluator 304, decrypter 306, encrypter 308, data server interface 310, data server 600, query processor 602, database application interface 606, key interface 608, deferred evaluation determiner 610, deferred expression determiner 612, flowchart 200, flowchart 400, flowchart 500, flowchart 700, flowchart 800, flowchart 900, and/or flowchart 1000 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 11:
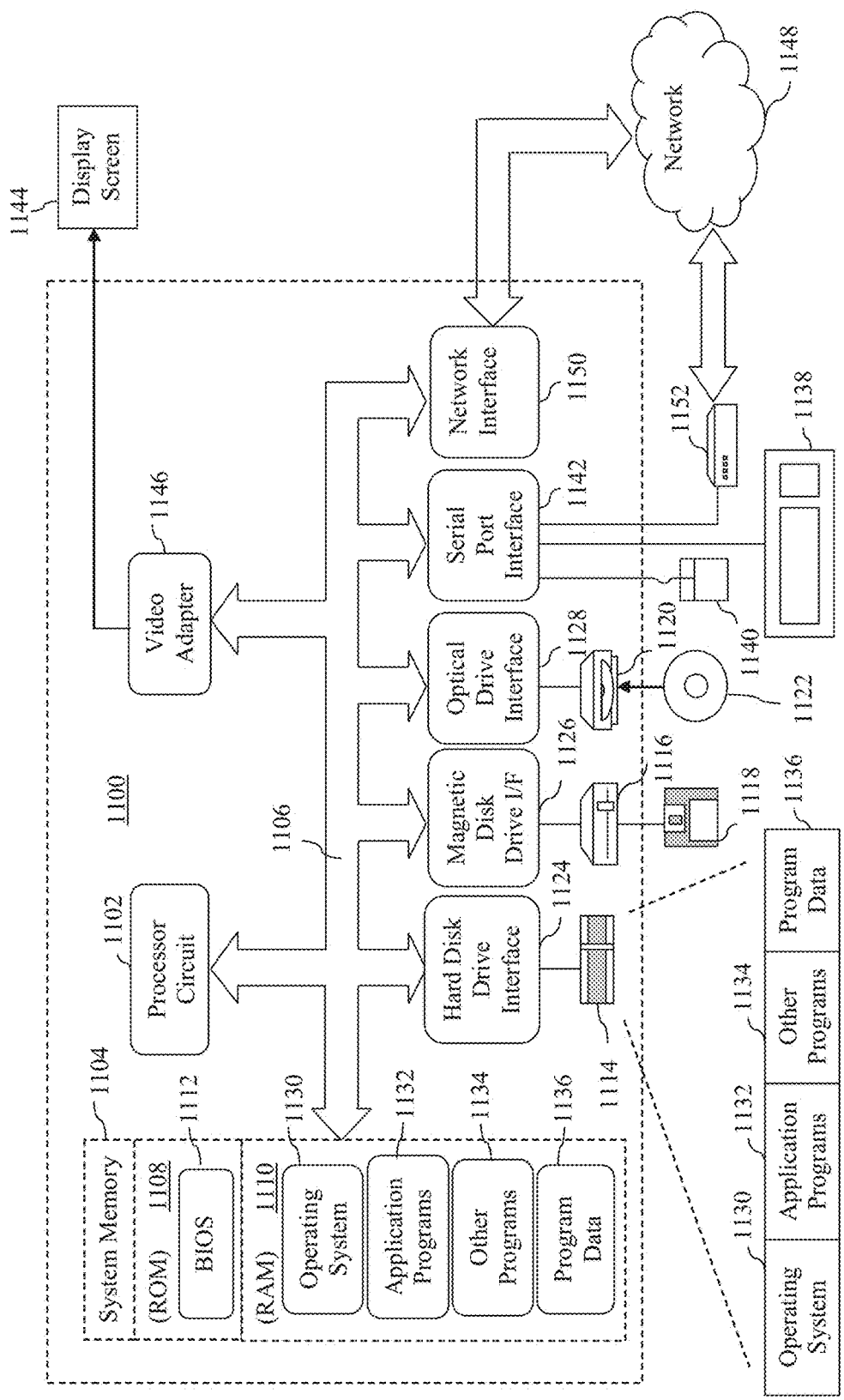
FIG. 11 shows a block diagram of an example computing device that may be used to implement embodiments.

FIG. 11 depicts an exemplary implementation of a computing device 1100 in which embodiments may be implemented. For example, data server 104, database application 106, first user device 108a, second user device 108b, database application 300, and/or data server 600 may be implemented in one or more computing devices similar to computing device 1100 in stationary computer embodiments, including one or more features of computing device 1100 and/or alternative features. The description of computing device 1100 provided herein is provided for purposes of illustration, and is not intended to be limiting. Embodiments may be implemented in further types of computer systems, as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing database application system 102, query processor 112, database client 114, application 116a, application 116b, database client 302, expression evaluator 304, decrypter 306, encrypter 308, query processor 602, deferred evaluation determiner 610, deferred expression determiner 612, flowchart 200, flowchart 400, flowchart 500, flowchart 700, flowchart 800, flowchart 900, and/or flowchart 1000 (including any suitable step of flowcharts 200, 400, 500, 700, 800, 900, 1000), and/or further embodiments described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media (including memory 1220 of FIG. 12). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In one embodiment, a method is provided in a data server implemented in at least one computing device, comprising: receiving a query from a database application, the query having been received by the database application from a requester; retrieving a set of data to evaluate the query, the set of data including encrypted data; designating the query for deferred evaluation by the database application rather than by the data server due to at least one predetermined factor; determining expression evaluation information for evaluating at least a portion of the query at the database application; and providing to the database application at least the encrypted data and the expression evaluation information for evaluation at the database application.

In an embodiment, the method further comprises: receiving a request from the database application for a data encryption key configured to decrypt the encrypted data; retrieving an encrypted version of the data encryption key from a key store containing data encryption keys that are encrypted using at least one master key; and providing the encrypted version of the data encryption key to the database application.

In an embodiment, the designating comprises: determining that the set of data includes encrypted data; and determining that the query includes an operation on the encrypted data that is unsupported at the data server.

In an embodiment, the determining that the set of data includes encrypted data comprises: accessing metadata at the data server that indicates which data stored in a database is encrypted.

In an embodiment, the determining of expression evaluation information for evaluating at least a portion of the query at the database application comprises: converting the at least a portion of the query into an abstract syntax tree (AST) that includes a plurality of expressions on a plurality of variables; setting a deferral flag for each expression in the AST to a true value; performing an iterative process that includes analyzing each expression in the AST for at least one criteria that prevents deferred evaluation of the expression, setting the deferral flag to false for each expression in the AST that satisfies the at least one criteria, setting the deferral flag to false for each expression in the AST that has a parent expression with a deferral flag set to false, and updating a set of the variables that that have to be evaluated eagerly; and iterating the iterative process until no further variables have to be evaluated eagerly.

In an embodiment, the analyzing each expression in the AST for at least one criteria comprises: determining, for each expression in the AST, at least one of whether the expression has side effects, whether the expression is considered too expensive to push to the database application, whether the expression includes a control flow statement, or whether the expression assigns to variables that have to be evaluated eagerly.

In an embodiment, the determining of expression evaluation information for evaluating at least a portion of the query at the database application comprises: indicating evaluation steps for the at least a portion of the query; and indicating a sequence of the evaluation steps.

In an embodiment, the determining of expression evaluation information for evaluating at least a portion of the query at the database application comprises: evaluating a portion of the query at the data server.

In another embodiment, at least one computing device comprises: a data server that includes memory and a query processor configured to receive a query from a database application, the query directed to a set of data stored at the data server, the query received by the database application from a requestor, the query processor including a deferred evaluation determiner configured to analyze the query and designate the query for deferred evaluation by the database application due to at least one predetermined factor, and a deferred expression determiner configured to determine expression evaluation information for evaluating at least a portion of the query at the database application; and the query processor configured to provide to the database application at least the encrypted data and the expression evaluation information for evaluation at the database application.

In an embodiment, the data server further comprises: a key interface configured to receive a request from the database application for a data encryption key configured to decrypt the encrypted data, retrieve an encrypted version of the data encryption key from a key store containing data encryption keys that are encrypted using at least one master key, and provide the encrypted version of the data encryption key to the database application.

In an embodiment, the deferred evaluation determiner is configured to determine that the set of data includes encrypted data, and to determine that the query includes an operation on the encrypted data that is unsupported at the data server, to analyze the query and designate the query for deferred evaluation by the database application based on the predetermined factor.

In an embodiment, the deferred evaluation determiner is configured to access metadata at the data server that indicates which data stored in a database is encrypted, to determine that the set of data includes the encrypted data.

In an embodiment, the deferred expression determiner is configured to indicate evaluation steps for evaluating the at least a portion of the query at the database application, and to indicate a sequence of the evaluation steps.

In an embodiment, the deferred evaluation determiner is configured to convert the query into an abstract syntax tree (AST) that includes a plurality of expressions on a plurality of variables; set a deferral flag for each expression in the AST to a true value; perform an iterative process that includes analyzing each expression in the AST for at least one criteria that prevents deferred evaluation of the expression, setting the deferral flag to false for each expression in the AST that satisfies the at least one criteria, setting the deferral flag to false for each expression in the AST that has a parent expression with a deferral flag set to false, and updating a set of the variables that that have to be evaluated eagerly; and iterate the iterative process until no further variables have to be evaluated eagerly.

In an embodiment, the analyzing each expression in the AST for at least one criteria comprises: determining, for each expression in the AST, at least one of whether the expression has side effects, whether the expression is considered too expensive to push to the database application, whether the expression includes a control flow statement, or whether the expression assigns to variables that have to be evaluated eagerly.

In an embodiment, the at least one computing device further comprises: a database application that includes memory and a database client configured to receive a query from a requester, the database client comprising a data server interface configured to provide the query with encrypted parameter data to a data server, and to receive from the data server encrypted retrieved data for the query and expression evaluation information representative for evaluating the query, and an expression evaluator configured to evaluate the expression evaluation information with the encrypted retrieved data to generate results for the query; and the database application configured to provide the results to the requester.

In another embodiment, a method is provided in a database application implemented in at least one computing device, comprising: receiving a query from a requester; providing the query to a data server; receiving from the data server encrypted retrieved data for the query and expression evaluation information for evaluating the query; evaluating the expression evaluation information with the encrypted retrieved data to generate results for the query; and providing the results to the requester.

In an embodiment, the method further comprises: determining the encrypted retrieved data is encrypted with an encryption key unavailable at the database application;

providing a request for a data encryption key configured to decrypt the encrypted retrieved data; receiving an encrypted version of the data encryption key; decrypting the encrypted version of the data encryption key with a master key available at the database application; and decrypting the encrypted retrieved data using the data encryption key to generate decrypted data; said evaluating performed using the decrypted data.

In an embodiment, the evaluating comprises: evaluating the expression evaluation information to perform an operation that is unsupported at the data server on encrypted data.

In an embodiment, the expression evaluation information indicates evaluation steps for at least a portion of the query and a sequence of the evaluation steps, said evaluating comprising: performing the evaluation steps according to the indicated evaluation steps.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a data server implemented in at least one computing device, comprising:
   receiving a query from a database application, the query having been received by the database application from a requester;
   retrieving a set of data to evaluate the query, the set of data including encrypted data;
   designating the query for deferred evaluation by the database application rather than by the data server due to at least one predetermined factor, said deferred evaluation enabling an untrusted server to perform operations on the encrypted data without an encryption key;
   determining expression evaluation information for evaluating at least a portion of the query at the database application, the expression evaluation information identifying query evaluation steps to be performed on decrypted database values generated from the encrypted data; and
   providing to the database application at least the encrypted data and the expression evaluation information for evaluation at the database application.

2. The method of claim 1, further comprising:
   receiving a request from the database application for a data encryption key configured to decrypt the encrypted data;
   retrieving an encrypted version of the data encryption key from a key store containing data encryption keys that are encrypted using at least one master key; and
   providing the encrypted version of the data encryption key to the database application.

3. The method of claim 1, wherein said designating comprises:
   determining that the set of data includes encrypted data; and
   determining that the query includes an operation on the encrypted data that is unsupported at the data server.

4. The method of claim 3, wherein said determining that the set of data includes encrypted data comprises:
   accessing metadata at the data server that indicates which data stored in a database is encrypted.

5. The method of claim 1, wherein said determining expression evaluation information for evaluating at least a portion of the query at the database application comprises:
   converting the query into an abstract syntax tree (AST) that includes a plurality of expressions on a plurality of variables;
   setting a deferral flag for each expression in the AST to a true value;
   performing an iterative process that includes
      analyzing each expression in the AST for at least one criteria that prevents deferred evaluation of the expression;
      setting the deferral flag to false for each expression in the AST that satisfies the at least one criteria;
      setting the deferral flag to false for each expression in the AST that has a parent expression with a deferral flag set to false; and
      updating a set of the variables that have to be evaluated eagerly; and
   iterating the iterative process until no further variables have to be evaluated eagerly.

6. The method of claim 5, wherein said analyzing each expression in the AST for at least one criteria comprises:
   determining, for each expression in the AST, at least one of
      whether the expression has side effects,
      whether the expression is considered too expensive to push to the database application,
      whether the expression includes a control flow statement, or
      whether the expression assigns to variables that have to be evaluated eagerly.

7. The method of claim 1, wherein said determining expression evaluation information for evaluating at least a portion of the query at the database application comprises:
   indicating evaluation steps for the at least a portion of the query; and
   indicating a sequence of the evaluation steps.

8. The method of claim 1, wherein said determining expression evaluation information for evaluating at least a portion of the query at the database application comprises:
   evaluating a portion of the query at the data server.

9. At least one computing device, comprising:
   a data server that includes memory and a query processor configured to receive a query from a database application, the query directed to a set of data stored at the data server, the query received by the database application from a requestor, the query processor including
      a deferred evaluation determiner configured to analyze the query and designate the query for deferred evaluation by the database application due to at least one predetermined factor, said deferred evaluation enabling an untrusted server to perform operations on encrypted data of the set of data without an encryption key, and
      a deferred expression determiner configured to determine expression evaluation information for evaluating at least a portion of the query at the database application, the expression evaluation information identifying query evaluation steps to be performed on decrypted database values generated from the encrypted data; and the query processor configured to provide to the database application at least the encrypted data and the expression evaluation information for evaluation at the database application.

10. The at least one computing device of claim 9, wherein the data server further comprises:

a key interface configured to receive a request from the database application for a data encryption key configured to decrypt the encrypted data, retrieve an encrypted version of the data encryption key from a key store containing data encryption keys that are encrypted using at least one master key, and provide the encrypted version of the data encryption key to the database application.

11. The at least one computing device of claim 9, wherein the deferred evaluation determiner is configured to determine that the set of data includes encrypted data, and to determine that the query includes an operation on the encrypted data that is unsupported at the data server, to analyze the query and designate the query for deferred evaluation by the database application based on the predetermined factor.

12. The at least one computing device of claim 11, wherein the deferred evaluation determiner is configured to access metadata at the data server that indicates which data stored in a database is encrypted, to determine that the set of data includes the encrypted data.

13. The at least one computing device of claim 9, wherein the deferred expression determiner is configured to indicate evaluation steps for evaluating the at least a portion of the query at the database application, and to indicate a sequence of the evaluation steps.

14. The at least one computing device of claim 9, wherein the deferred evaluation determiner is configured to convert the query into an abstract syntax tree (AST) that includes a plurality of expressions on a plurality of variables;

set a deferral flag for each expression in the AST to a true value;

perform an iterative process that includes analyzing each expression in the AST for at least one criteria that prevents deferred evaluation of the expression, setting the deferral flag to false for each expression in the AST that satisfies the at least one criteria, setting the deferral flag to false for each expression in the AST that has a parent expression with a deferral flag set to false, and updating a set of the variables that have to be evaluated eagerly; and iterate the iterative process until no further variables have to be evaluated eagerly.

15. The at least one computing device of claim 14, wherein said analyzing each expression in the AST for at least one criteria comprises:

determining, for each expression in the AST, at least one of whether the expression has side effects, whether the expression is considered too expensive to push to the database application, whether the expression includes a control flow statement, or whether the expression assigns to variables that have to be evaluated eagerly.

16. The at least one computing device of claim 9, further comprising:

a database application that includes memory and a database client configured to receive a query from a requester, the database client comprising a data server interface configured to provide the query with encrypted parameter data to a data server, and to receive from the data server encrypted retrieved data for the query and expression evaluation information for evaluating the query, and an expression evaluator configured to evaluate the expression evaluation information with the encrypted retrieved data to generate results for the query; and the database application configured to provide the results to the requester.

17. A method in a database application implemented in at least one computing device, comprising:

receiving a query from a requester;

providing the query to a data server;

receiving from the data server encrypted retrieved data for the query and expression evaluation information representative of the query, the query designated by the data server for deferred evaluation and the expression evaluation information identifying query evaluation steps to be performed on decrypted database values generated from the encrypted retrieved data;

decrypting the encrypted retrieved data to generate the decrypted database values;

evaluating the expression evaluation information with the decrypted database values;

generating results for the query based on the evaluation; and providing the results to the requester.

18. The method of claim 17, further comprising:

determining the encrypted retrieved data is encrypted with an encryption key unavailable at the database application;

providing a request for a data encryption key configured to decrypt the encrypted retrieved data;

receiving an encrypted version of the data encryption key;

decrypting the encrypted version of the data encryption key with a master key available at the database application; and decrypting the encrypted retrieved data using the data encryption key to generate decrypted data;

said evaluating performed using the decrypted data.

19. The method of claim 17, wherein said evaluating comprises:

evaluating the expression evaluation information to perform an operation that is unsupported at the data server on encrypted data.

20. The method of claim 17, wherein the expression evaluation information indicates evaluation steps for at least a portion of the query and a sequence of the evaluation steps, said evaluating comprising:

performing the evaluation steps according to the indicated evaluation steps.

21. At least one computing device, comprising:

at least one processor circuit; and at least one memory that stores a database application configured to be executed by the at least one processor circuit, the database application, comprising:

a database client configured to receive a query from a requester, and to provide the query to a data server, the database client including:

a decrypter configured to:

receive from the data server encrypted retrieved data for the query; and decrypt the encrypted retrieved data to generate decrypted database values; and an expression evaluator configured to:
receive from the decrypter the decrypted database values;
receive from the data server expression evaluation information representative of the query, the query designated by the data server for deferred evaluation and the expression evaluation information identifying query evaluation steps to be performed on the decrypted database values; and
evaluate the expression evaluation information with the decrypted database values to generate results for the query to provide to the requester.

22. The at least one computing device of claim 21, wherein the encrypted retrieved data is determined to be encrypted with an encryption key unavailable at the database application, and wherein the decrypter is further configured to provide a request for a data encryption key configured to decrypt the encrypted retrieved data, to receive an encrypted version of the data encryption key, to decrypt the encrypted version of the data encryption key with a master key available at the database application, and to decrypt the encrypted retrieved data using the data encryption key to generate decrypted data.

23. The at least one computing device of claim 21, wherein the expression evaluator is configured to perform an operation that is unsupported at the data server on encrypted data.

24. The at least one computing device of claim 21, wherein the expression evaluation information indicates evaluation steps for at least a portion of the query and a sequence of the evaluation steps, and the expression evaluator is configured to perform the evaluation steps according to the indicated evaluation steps.

* * * * *